US012659113B2

(12) United States Patent
Taghizadeh Motlagh et al.

(10) Patent No.: US 12,659,113 B2
(45) Date of Patent: Jun. 16, 2026

(54) FULL DUPLEX REFERENCE SIGNAL CONFIGURATION

(71) Applicant: Lenovo (Singapore) Pte. Ltd., New Tech Park (SG)

(72) Inventors: Seyedomid Taghizadeh Motlagh, Oberursel (DE); Ankit Bhamri, Rödermark (DE); Sher Ali Cheema, Ilmenau (DE); Ali Ramadan Ali, Kraiburg am Inn (DE); Hossein Bagheri, Urbana, IL (US); Karthikeyan Ganesan, Kronberg im Taunus (DE); Hyejung Jung, Northbrook, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 215 days.

(21) Appl. No.: 18/550,112

(22) PCT Filed: Mar. 11, 2022

(86) PCT No.: PCT/IB2022/052227
§ 371 (c)(1),
(2) Date: Sep. 11, 2023

(87) PCT Pub. No.: WO2022/190069
PCT Pub. Date: Sep. 15, 2022

(65) Prior Publication Data
US 2024/0163058 A1      May 16, 2024
Related U.S. Application Data

(60) Provisional application No. 63/159,923, filed on Mar. 11, 2021.

(51) Int. Cl.
*H04L 5/00* (2006.01)
*H04L 5/14* (2006.01)

(52) U.S. Cl.
CPC .............. *H04L 5/0051* (2013.01); *H04L 5/14* (2013.01)

(58) Field of Classification Search
CPC ... H04L 5/0051; H04L 5/0007; H04L 5/0035; H04L 5/14
See application file for complete search history.

(56) References Cited

U.S. PATENT DOCUMENTS 11,711,827 B2 * 7/2023 Duan ................ H04L 27/26025
370/329
2017/0041118 A1 * 2/2017 Liu ....................... H04L 1/0009
(Continued)

FOREIGN PATENT DOCUMENTS

CN   111492603 A   8/2020
CN   111788845 A   10/2020
(Continued)

OTHER PUBLICATIONS

PCT/IB2022/052227, "Notification of Transmittal of the International Search Report and the Written Opinion of the International Searching Authority, or the Declaration", International Searching Authority, Aug. 26, 2022, pp. 1-19.
(Continued)

*Primary Examiner* — Bailor C Hsu
(74) *Attorney, Agent, or Firm* — Kunzler Needham Hilton

(57) ABSTRACT

Apparatuses, methods, and systems are disclosed for interference management for full-duplex operation. One apparatus includes a processor and a transceiver that receives a first configuration from a RAN, wherein the first configuration includes one or more of: an UL full-duplex reference signal ("FD-RS") configuration, a DL FD-RS configuration, an indication to activate the UL FD-RS configuration, and/or an indication to activate the DL FD-RS configuration, where the UL FD-RS configuration and the DL FD-RS configuration are not simultaneously activated at the apparatus. The
(Continued)

1100

Start

Receive from a RAN a first configuration that includes:
A) an UL FD-RS configuration indicating at least time-frequency resources, a multiplexing type, and time-domain behavior for UL FD-RS transmission and/or measurement;
B) a DL FD-RS configuration indicating at least time-frequency resources, a multiplexing type, and time-domain behavior for DL FD-RS reception and measurement;
C) an indication to activate the UL FD-RS configuration and to perform corresponding transmissions/measurements;
D) an indication to activate the DL FD-RS configuration and to perform corresponding measurements; or
E) some combination thereof, where the UE is not simultaneously activated with the UL FD-RS configuration and the DL FD-RS configuration

1105

Perform a first activity selected from:
1) transmission on received UL FD-RS resources;
2) measurement on received UL FD-RS resources;
3) measurement on received DL FD-RS resources; or
4) some combination thereof

1110

End processor performs a first activity according to the first configuration, the first activity being one or more of: transmission on received UL FD-RS resources, measurement on received UL FD-RS resources, and/or measurements on the received DL FD-RS resources.

20 Claims, 9 Drawing Sheets

(56)                    References Cited

U.S. PATENT DOCUMENTS

| | | | | |
|---|---|---|---|---|
| 2020/0214018 A1* | 7/2020 | Venugopal | .......... | H04W 72/046 |
| 2021/0409095 A1* | 12/2021 | Zhang | ................... | H04W 76/19 |
| 2021/0409097 A1* | 12/2021 | Zhang | ................... | H04B 7/088 |
| 2022/0086658 A1* | 3/2022 | Zhang | ................... | H04L 5/0051 |
| 2023/0141830 A1* | 5/2023 | Zhang | ................... | H04L 5/0048 |
| | | | | 370/329 |
| 2024/0388401 A1* | 11/2024 | Ibrahim | ............... | H04B 7/0626 |

FOREIGN PATENT DOCUMENTS

| | | |
|---|---|---|
| EP | 3454477 A1 | 3/2019 |
| EP | 3713113 B1 | 5/2023 |
| EP | 3738337 B1 | 4/2025 |
| WO | 2018058455 A1 | 4/2018 |
| WO | 2020238662 A1 | 12/2020 |

OTHER PUBLICATIONS

Cirik et al., "Linear Transceiver Design for Full-Duplex Multi-Cell MIMO Systems", IEEE, Sep. 16, 2016, pp. 1-12.

Cirik et al., QoS Considerations for Full Duplex Multi-user MIMO Systems, IEEE Wireless Communications Letters, Jan. 2015, pp. 1-7.

Cirik et al., "Robust Transceiver Design in Fill-Duplex MIMO Cognitive Radios", IEEE Transactions on Vehicular Technology (vol. 67, Issue 2), Feb. 2018, pp. 1-4.

Taghizadeh et al., "Hardware Impairments Aware Transceiver Design for Bidirectional Full-Duplex MIMO OFDM Systems", IEEE, Feb. 8, 2018, pp. 1-16.

Taghizadeh et al., "Interference Mitigation via Power Optimization Schemes for Full-Duplex Networking", WSA 2015, Mar. 3-5, 2015, pp. 1-7.

Zhang et al., "Full duplex techniques for 5G networks: self-interference cancellation, protocol design, and relay selection", IEEE Communications Magazine (vol. 53, Issue 5), May 2015, pp. 1-4.

Zte et al., "Discussion on duplex and interference management", 3GPP TSG RAN WG1 Meeting #87 R1-1612156, Nov. 14-18, 2016, pp. 1-10.

3GPP, "3rd Generation Partnership Project; Technical Specification Group Radio Access Network; NR; Physical channels and modulation (Release 16)", 3GPP TS 38.211 V16.4.0, Dec. 2020, pp. 1-133.

3GPP, "3rd Generation Partnership Project; Technical Specification Group Radio Access Network; NR; Multiplexing and channel coding (Release 16)", 3GPP TS 38.212 V16.4.0, Dec. 2020, pp. 1-152.

3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

3GPP, "3rd Generation Partnership Project; Technical Specification Group Radio Access Network; NR; User Equipment (UE) radio access capabilities (Release 16)", 3GPP TS 38.306 V16.3.0, Dec. 2020, pp. 1-135.

3GPP, "3rd Generation Partnership Project; Technical Specification Group Radio Access Network; NR; Medium Access Control (MAC) protocol specification (Release 16)", 3GPP TS 38.321 V16.3.0, Dec. 2020, pp. 1-156.

* cited by examiner

500

| Duplex Mode | Frequency | Time |
|---|---|---|
| FDD | | |
| TDD | | |
| Full Duplex | | |

600

1200

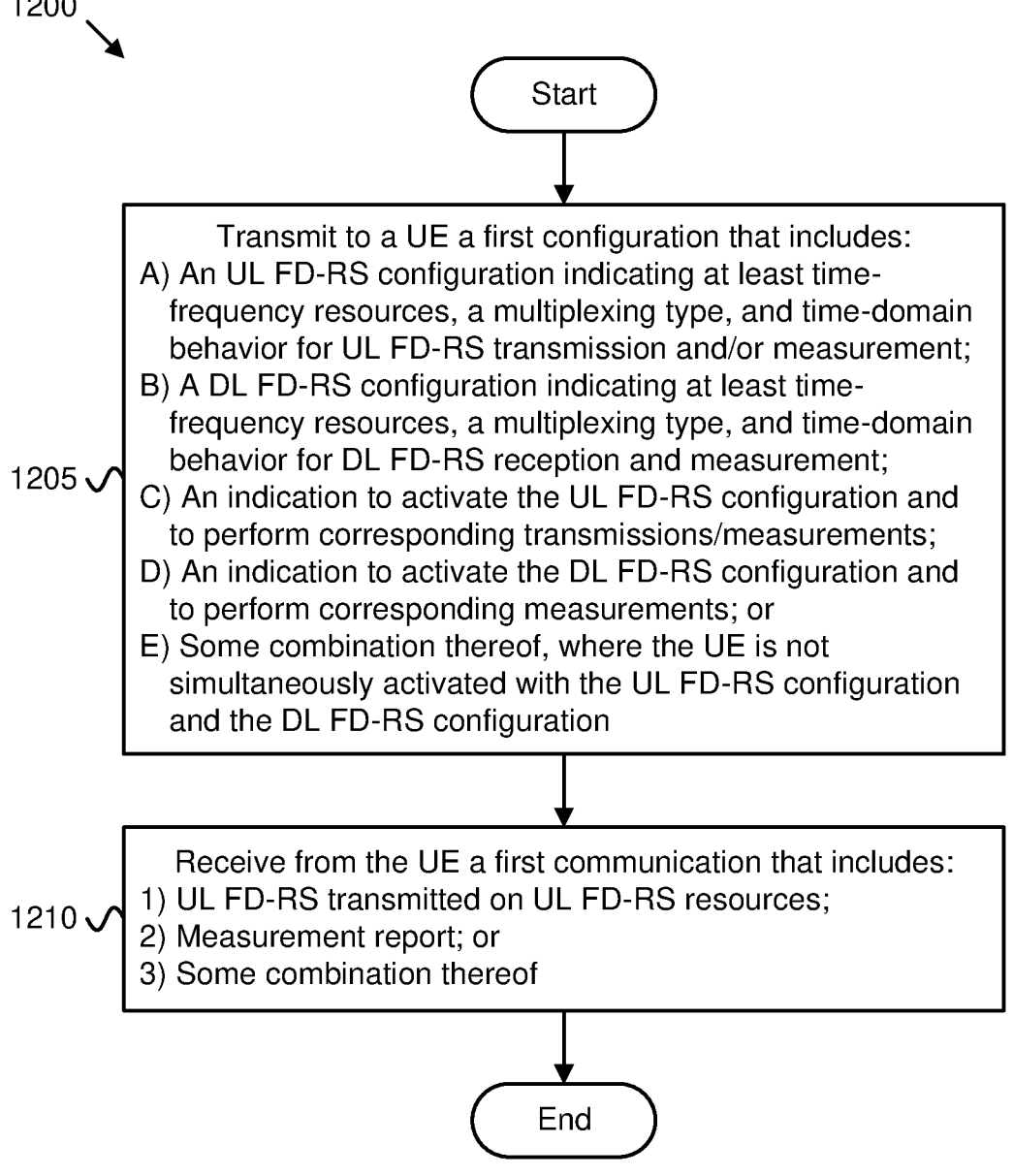

Start

Transmit to a UE a first configuration that includes:
A) An UL FD-RS configuration indicating at least time-frequency resources, a multiplexing type, and time-domain behavior for UL FD-RS transmission and/or measurement;
B) A DL FD-RS configuration indicating at least time-frequency resources, a multiplexing type, and time-domain behavior for DL FD-RS reception and measurement;
C) An indication to activate the UL FD-RS configuration and to perform corresponding transmissions/measurements;
D) An indication to activate the DL FD-RS configuration and to perform corresponding measurements; or
E) Some combination thereof, where the UE is not simultaneously activated with the UL FD-RS configuration and the DL FD-RS configuration

1205

Receive from the UE a first communication that includes:
1) UL FD-RS transmitted on UL FD-RS resources;
2) Measurement report; or
3) Some combination thereof

1210

End

FIG. 12

FULL DUPLEX REFERENCE SIGNAL CONFIGURATION

CROSS-REFERENCE TO RELATED APPLICATIONS

This application claims priority to U.S. Provisional Patent Application No. 63/158,790 entitled "INTERFERENCE MANAGEMENT FOR FULL DUPLEX MODE" and filed on 11 Mar. 2021 for Seyedomid Taghizadeh Motlagh, Ankit Bhamri, Sher Ali Cheema, Ali Ramadan Ali, Hossein Bagheri, Karthikeyan Ganesan, Hyejung Jung, which application is incorporated herein by reference.

FIELD

The subject matter disclosed herein relates generally to wireless communications and more particularly relates to interference management for full duplex mode operation, e.g., in NR.

BACKGROUND

For Third Generation Partnership Project ("3GPP") New Radio ("NR", i.e., $5^{th}$ generation Radio Access Technology ("RAT")), time-division duplexing ("TDD") may be used in unpaired spectrum to avoid interference (e.g., UL and/or DL interference within a network entity and UE-to-UE interference). However, TDD limits UL and DL transmission opportunities and prevents accommodating urgent UL and DL transmissions simultaneously.

Full-duplex ("FD") operation is characterized by the capability to concurrently transmit and receive at the same time and frequency resource. The FD operation at a gNB (i.e., an NR base station) facilitates reception from a group of user equipment devices ("UEs") in the UL simultaneously with the DL transmission to another (and potentially disjoint) group of UEs, coexisting at the same channel. However, the co-channel transmission from (alternatively, co-channel reception to) the gNB results in the emergence of new sources of interference.

BRIEF SUMMARY

Disclosed are procedures for interference management for full-duplex operation. Said procedures may be implemented by apparatus, systems, methods, or computer program products.

One method at a User Equipment ("UE") for interference management for full-duplex operation includes receiving a first configuration from a radio access network ("RAN"). Here, the first configuration includes: A) an uplink ("UL") full-duplex reference signal ("FD-RS") configuration; B) a downlink ("DL") FD-RS configuration; C) an indication to activate the UL FD-RS configuration and to perform corresponding transmissions and/or measurements; D) an indication to activate the DL FD-RS configuration and to perform corresponding measurements; or E) some combination thereof, where the UE is not simultaneously activated with the UL FD-RS configuration and the DL FD-RS configuration. The UL FD-RS configuration indicates at least time-frequency resources, a multiplexing type, and time-domain behavior for UL FD-RS transmission and/or measurement. The DL FD-RS configuration indicates at least time-frequency resources, a multiplexing type, and time-domain behavior for DL FD-RS reception and measurement. The method includes performing a first activity according to the first configuration, where the first activity is selected from: 1) transmission on received UL FD-RS resources; 2) measurement on received UL FD-RS resources; 3) measurement on received DL FD-RS resources; or 4) some combination thereof.

One method at a RAN for interference management for full-duplex operation includes transmitting a first configuration to a UE. Here, the first configuration includes: A) an UL FD-RS configuration; B) a DL FD-RS configuration; C) an indication to activate the UL FD-RS configuration and to perform corresponding transmissions and/or measurements; D) an indication to activate the DL FD-RS configuration and to perform corresponding measurements; or E) some combination thereof, where a UE is not simultaneously activated with the UL FD-RS configuration and the DL FD-RS configuration. The UL FD-RS configuration indicates at least time-frequency resources, a multiplexing type, and time-domain behavior for UL FD-RS transmission and/or measurement. The DL FD-RS configuration indicates at least time-frequency resources, a multiplexing type, and time-domain behavior for DL FD-RS measurement. The method includes receiving a first communication from the UE, where the first communication includes at least one of: 1) an UL FD-RS transmitted on UL FD-RS resources according to the first configuration; 2) a report of measurements performed according to the first configuration; or 3) a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 12 is a flowchart diagram illustrating one embodiment of a second method for interference management for full-duplex operation.

DETAILED DESCRIPTION

Figure 1:
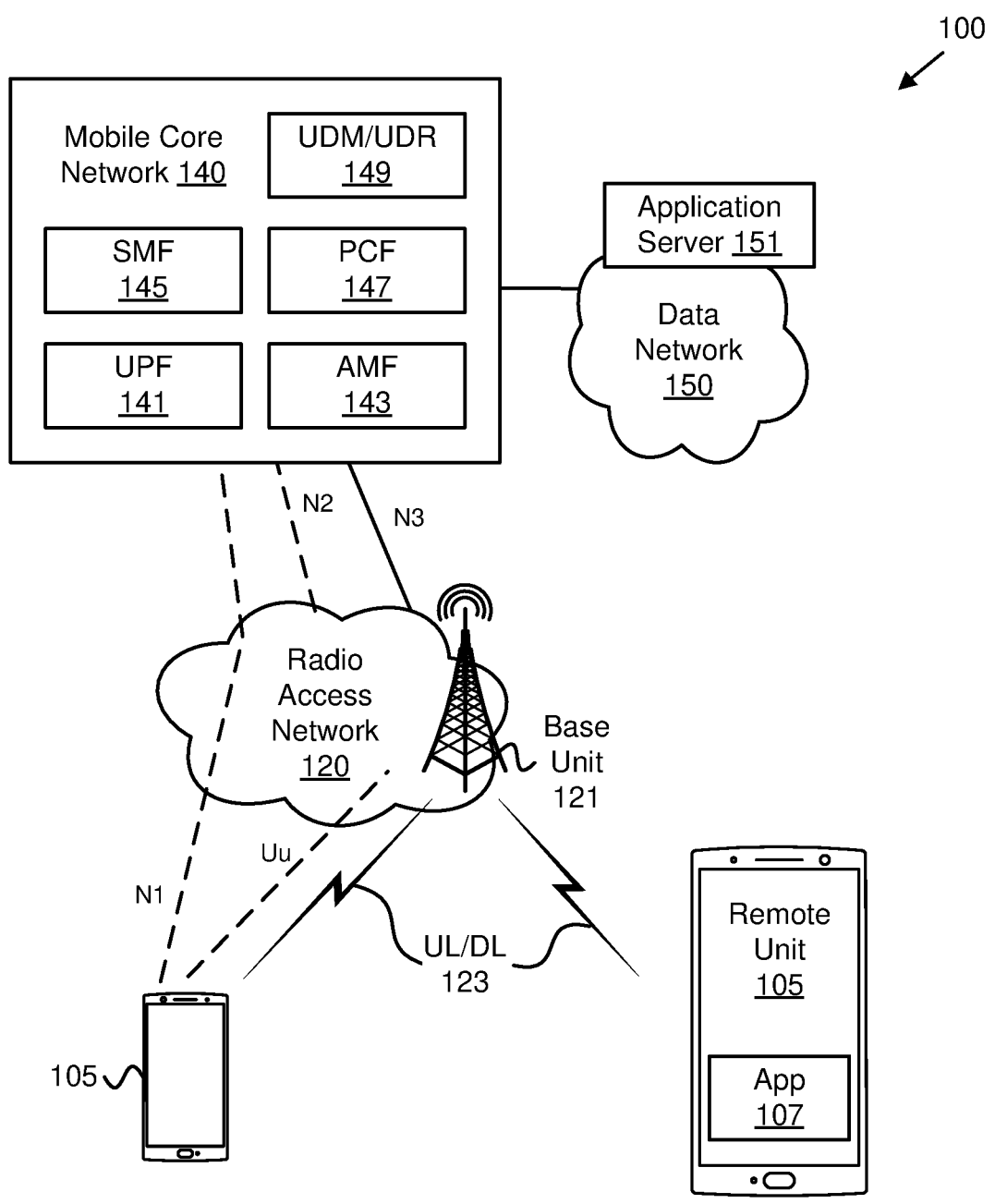
FIG. 1 is a block diagram illustrating one embodiment of a wireless communication system for interference management for full-duplex operation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for interference management for full-duplex operation. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Full duplex ("FD") operation at a serving gNB could allow the gNB to receive UL transmissions from a first set of UEs and transmit DL transmissions to a second set of UEs at the same time. Such an operation could bring gains/enhancements in terms of increasing spectral efficiency and/or reducing latency compared to a half-duplex gNB. As used herein, the term "FD-gNB" refers to a RAN node (i.e., gNB) that is capable of full-duplex operation.

FD operation is characterized by the capability to concurrently transmit and receive at the same time and frequency resource, which is facilitated by the means of self-interference cancellation ("SIC") at an FD node. The FD operation at a gNB facilitates reception from a group of UEs in the uplink simultaneously with the DL transmission to another (and potentially disjoint) group of UEs, coexisting at the same channel. As a result, this shows potential for an enhanced spectral efficiency and a reduced latency. Nevertheless, the co-channel transmission (reception) from (to) the gNB results in the emergence of new types of interference. In order to realize the potential gains of FD operation, the impact of interference needs to be properly managed.

This disclosure provides mechanisms to enable interference management in a network where gNB is operating in the FD mode. The disclosed mechanisms provide enhancements related to UE-to-UE interference for FD mode at the gNB and to gNB self-interference for FD mode at the gNB.

Described herein are solutions for interference management to facilitate full-duplex operation at the gNB, wherein, at least the following enhancements for interference measurement and corresponding reporting are proposed and described:

According to a first solution, UE-to-UE Co-Channel Interference ("CCI") measurement and reporting for FD gNB operation is supported by implementing a new type of UL reference signal ("RS"), referred to herein as UL FD-RS, which can either be common to a group of UEs or be UE-specifically configured to each of the UEs (intended for UL). In one embodiment, the UL FD-RS is an enhanced Sounding Reference Signal ("SRS"). Additionally, a corresponding DL RS may be implemented—referred to herein as DL FD-RS—where the DL resources are muted for a group of UEs (intended for DL). In one embodiment, the DL FD-RS is a zero-power ("ZP") Channel State Information Reference Signal ("CSI-RS").

According to a second solution, UE-to-UE CCI measurement and reporting for FD gNB operation is supported by implementing new reporting quantities to indicate measurements specific for UE-to-UE interference. In addition to UE-to-UE CCI measurements, the present disclosure facilitates measurements specific to other types of interference appearing due to the FD operation at gNB.

According to a third solution, FD gNB operation is supported by facilitating self-interference measurements for interference appearing due to the FD operation at the FD-gNB. According to a fourth solution, FD gNB operation is supported by facilitating inter-gNB interference measurements for interference appearing due to the FD operation at the FD-gNB.

FIG. 1 depicts a wireless communication system 100 for interference management for full-duplex operation, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more uplink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a PDN Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

Note that during NR operation on unlicensed spectrum (referred to as "NR-U"), the base unit 121 and the remote unit 105 communicate over unlicensed (i.e., shared) radio spectrum. Similarly, during LTE operation on unlicensed spectrum (referred to as "LTE-U"), the base unit 121 and the remote unit 105 also communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling, NAS ciphering and integrity protection, registration management, connection management, mobility management, access authentication and authorization, security context management. The SMF 145 is responsible for session management (i.e., session establishment, modification, release), remote unit (i.e., UE) Internet Protocol ("IP") address allocation and management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for interference management for full-duplex operation apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station/base unit, but it is replaceable by any other radio access node, e.g., RAN node, ng-eNB, eNB, Base Station ("BS"), Access Point ("AP"), NR BS, 5G NB, Transmission and Reception Point ("TRP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for interference management for full-duplex operation.

Figure 2:
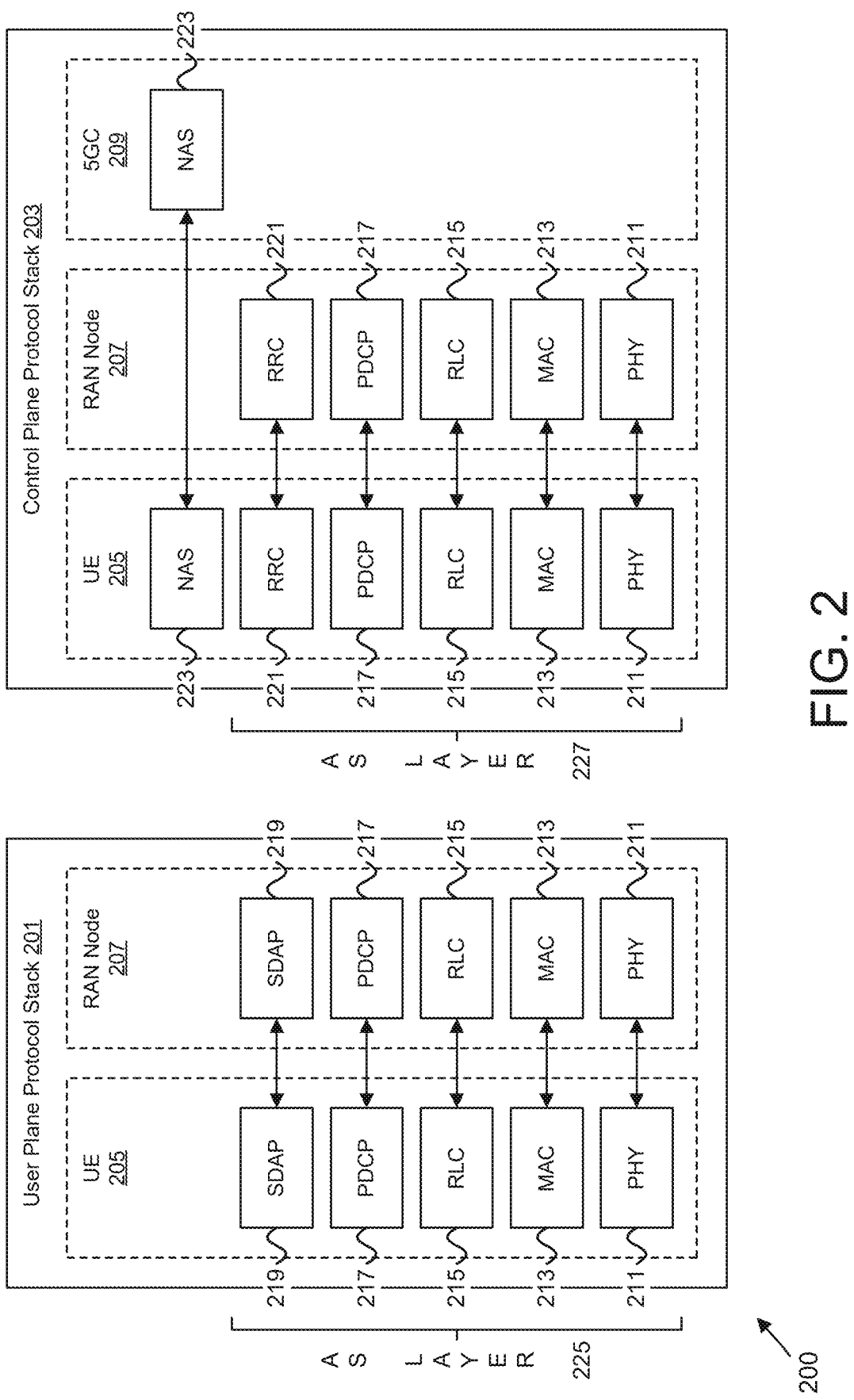
FIG. 2 is a diagram illustrating one embodiment of a Third Generation Partnership Project ("3GPP") New Radio ("NR") protocol stack.

FIG. 2 depicts a NR protocol stack 200, according to embodiments of the disclosure. While FIG. 2 shows a UE 205, a RAN node 207 and the 5G core network 209, these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 211, a Medium Access Control ("MAC") sublayer 213, a Radio Link Control ("RLC") sublayer 215, a Packet Data Convergence Protocol ("PDCP") sublayer 217, and Service Data Adaptation Protocol ("SDAP") layer 219. The Control Plane protocol stack 203 includes a physical layer 211, a MAC sublayer 213, a RLC sublayer 215, and a PDCP sublayer 217. The Control Place protocol stack 203 also includes a Radio Resource Control ("RRC") layer 221 and a Non-Access Stratum ("NAS") layer 223.

The AS layer 225 (also referred to as "AS protocol stack") for the User Plane protocol stack 201 consists of at least SDAP, PDCP, RLC and MAC sublayers, and the physical layer. The AS layer 227 for the Control Plane protocol stack 203 consists of at least RRC, PDCP, RLC and MAC sublayers, and the physical layer. The Layer-1 ("L1") contains the PHY layer 211. The Layer-2 ("L2") is split into the SDAP, PDCP, RLC and MAC sublayers. The Layer-3 ("L3") includes the RRC sublayer 221 and the NAS layer 223 for the control plane and includes, e.g., an Internet Protocol ("IP") layer or PDU Layer (note depicted) for the user plane. L1 and L2 are referred to as "lower layers," while L3 and above (e.g., transport layer, application layer) are referred to as "higher layers" or "upper layers." As an example, "upper layer signaling" may refer to signaling exchange at the RRC layer 221.

The physical layer 211 offers transport channels to the MAC sublayer 213. The MAC sublayer 213 offers logical channels to the RLC sublayer 215. The RLC sublayer 215 offers RLC channels to the PDCP sublayer 217. The PDCP sublayer 217 offers radio bearers to the SDAP sublayer 219 and/or RRC layer 221. The SDAP sublayer 219 offers QoS flows to the core network (e.g., 5GC). The RRC layer 221 provides for the addition, modification, and release of Carrier Aggregation ("CA") and/or Dual Connectivity ("DC"). The RRC layer 221 also manages the establishment, configuration, maintenance, and release of Signaling Radio Bearers ("SRBs") and Data Radio Bearers ("DRBs").

The NAS layer 223 is between the UE 205 and the 5GC 209. NAS messages are passed transparently through the RAN. The NAS layer 223 is used to manage the establishment of communication sessions and for maintaining continuous communications with the UE 205 as it moves between different cells of the RAN. In contrast, the AS layer 225/227 is between the UE 205 and the RAN carries information over the wireless portion of the network. While not depicted in FIG. 2, the IP layer exists above the NAS layer 223, a transport layer exists above the IP layer, and an application layer exists above the transport layer.

The MAC layer 213 is the lowest sublayer in the Layer-2 architecture of the NR protocol stack. Its connection to the PHY layer 211 below is through transport channels, and the connection to the RLC layer 215 above is through logical channels. The MAC layer 213 therefore performs multiplexing and demultiplexing between logical channels and transport channels: the MAC layer 213 in the transmitting side constructs MAC PDUs, known as transport blocks, from MAC Service Data Units ("SDUs") received through logical channels, and the MAC layer 213 in the receiving side recovers MAC SDUs from MAC PDUs received through transport channels.

The MAC layer 213 provides a data transfer service for the RLC layer 215 through logical channels, which are either control logical channels which carry control data (e.g., RRC signaling) or traffic logical channels which carry user plane data. On the other hand, the data from the MAC layer 213 is exchanged with the physical layer through transport channels, which are classified as downlink or uplink. Data is multiplexed into transport channels depending on how it is transmitted over the air.

The PHY layer 211 is responsible for the actual transmission of data and control information via the air interface, i.e., the PHY Layer 211 carries all information from the MAC transport channels over the air interface on the transmission side. Some of the important functions performed by the PHY layer 211 include coding and modulation, link adaptation (e.g., Adaptive Modulation and Coding ("AMC")), power control, cell search (for initial synchronization and handover purposes) and other measurements (inside the 3GPP system (i.e., NR and/or LTE system) and between systems) for the RRC layer 221. The PHY layer 211 performs transmissions based on transmission parameters, such as the modulation scheme, the coding rate (i.e., the modulation and coding scheme ("MCS")), the number of physical resource blocks, etc.

Figure 3:
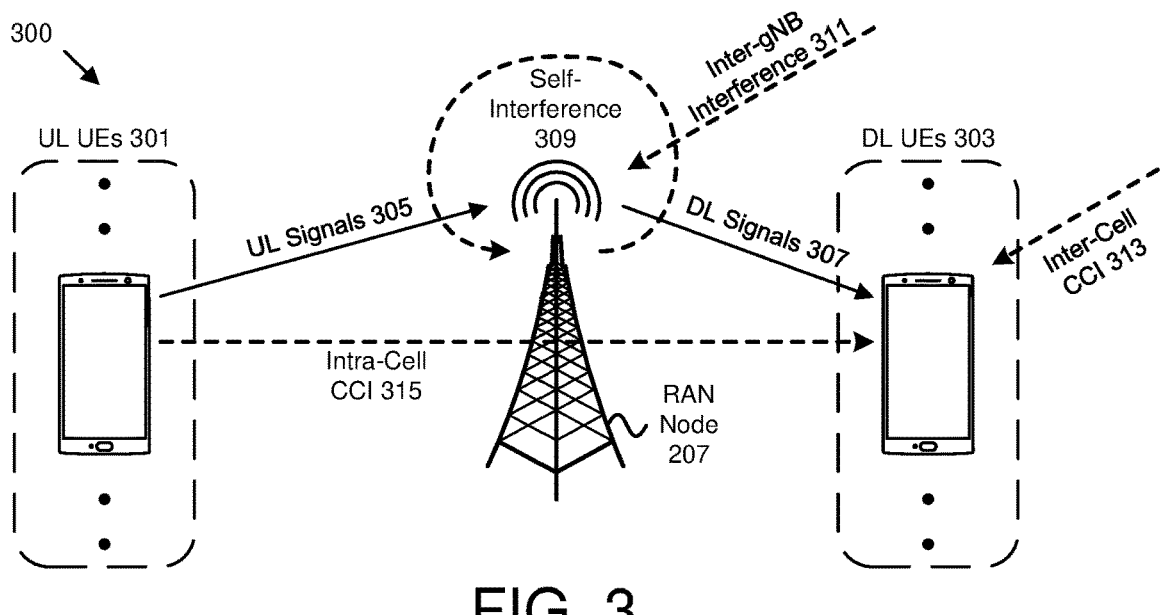
FIG. 3 is a diagram illustrating one embodiment of an augmented interference pattern specific to FD operation at gNB.

FIG. 3 depicts an interference pattern 300 specific to FD operation at a RAN node (e.g., gNB), according to embodiments of the disclosure. The sources of interference that appear due to FD operation may include the RAN node 207 (e.g., an instance of the base unit 121) and a set of at least one UE 301 performing UL transmission (denoted as "UL UEs," each of which may be an instance of the remote unit 105 and/or UE 205). The generated interference may prevent the RAN node 207 from correctly receiving UL transmission(s) 305 from one or more of the UL UEs 301 and/or prevent a set of at least one UE 303 performing DL reception (denoted as "DL UEs," each of which may be an instance of the remote unit 105 and/or UE 205) from correctly receiving DL transmission(s) 307 from the RAN node 207.

The types of interference that appear due to FD operation may be summarized as: i) self-interference 309, ii) inter-gNB interference 311, iii) inter-cell co-channel interference 313, and iv) intra-cell co-channel interference 315. The nature of such types of interference, as well as the associated solutions, are summarized in the following.

The term "Self-interference" refers to interference appearing at the RAN node 207 (i.e., a FD-gNB) due to co-channel transmission, i.e., from the DL transmission to the UL reception at the RAN node 207. One example of this type of interference is the self-interference 309, depicted in FIG. 3. Techniques to combat this interference include various analog and digital processing strategies which can be implemented in the RAN node 207. However, a remaining challenge is facilitating the measurement for the quality of self-interference cancellation for the specific transmission/reception characteristics, e.g., a specific Tx and Rx antenna port, resource block ("RB"), corresponding to a specific UL and DL co-channel transmission. This is needed to facilitate DL to UL interference management via scheduling/resource allocation.

The term "Inter-gNB interference" refers to interference among different RAN nodes (gNBs) due to the joint DL transmission (at one RAN node) and UL reception (at an adjacent RAN node). One example of this type of interference is the inter-gNB interference 311, depicted in FIG. 3. Techniques to combat this interference include coordinated scheduling among the RAN nodes (e.g., beamforming with the awareness of the Inter-gNB interference channel) and/or coherent transmission and reception. However, a remaining challenge is facilitating the measurement of the inter-gNB interference for specific transmission/reception characteristics.

The term "Intra-cell co-channel interference" refers to Co-Channel Interference ("CCI") between the UL transmissions and DL transmissions of the same cell, coexisting on the same channel resource. One example of this type of interference is the inter-cell CCI 313, depicted in FIG. 3. Techniques to combat this interference are scheduling, power and beam adjustments with the awareness of the CCI channels. However, a remaining challenge is obtaining knowledge of the CCI channels between UL and DL users are not primitively achieved by the traditional implementations specific to half-duplex gNBs, and require additional overhead. The aforementioned evaluations do not provide concrete procedures to achieve this goal.

The term "Inter-cell co-channel interference" refers to interference between the UL transmissions in one cell and the DL transmissions of a neighboring cell, coexisting on the same channel resource. The fundamental problem and potential solutions are the same as intra-cell co-channel interference. One example of this type of interference is the intra-cell CCI 315, depicted in FIG. 3. Techniques to combat this interference are scheduling, power and beam adjustments with the awareness of the CCI channels. However, similar to the case of intra-cell CCI, a remaining challenge is obtaining knowledge of the CCI channels between UL and DL users are not primitive and require optimized procedures. The below solutions address these remaining challenges.

Disclosed are solutions for interference management for supporting full-duplex operation. The solutions may be implemented by apparatus, systems, methods, or computer program products. The disclosure describes a new reference signal (i.e., Full-Duplex Reference Signal ("FD-RS")) and related configurations. The disclosure also describes new measurement-specific reporting configurations, e.g., specific to the nature of the intended interference measurements.

The disclosed configurations cover various aspects of interference measurements where a RAN node (e.g., gNB) operates in the full-duplex ("FD") mode, including UE-to-UE co-channel interference ("CCI"), the RAN node 207 self-interference and inter-gNB interference. In some embodiments, a common configuration for UL FD-RS is supported, where at least the same set of time-frequency resources are configured to a group of UEs. In certain embodiments, a Quasi-Co-Location ("QCL") assumption for each UE may be updated on a UE-specific basis. In some embodiments, activation and/or deactivation of the FD-RS (i.e., UL FD-RS or DL FD-RS) may be based on an indication of FD mode by the RAN node.

Please note that in this disclosure that DL FD-RS could either be a new type of DL RS or an existing DL RS in NR or an enhanced type of existing DL RS in NR and similarly UL FD-RS could either be a new type of UL RS or an existing UL RS in NR or an enhanced type of existing UL RS in NR.

Figure 4:
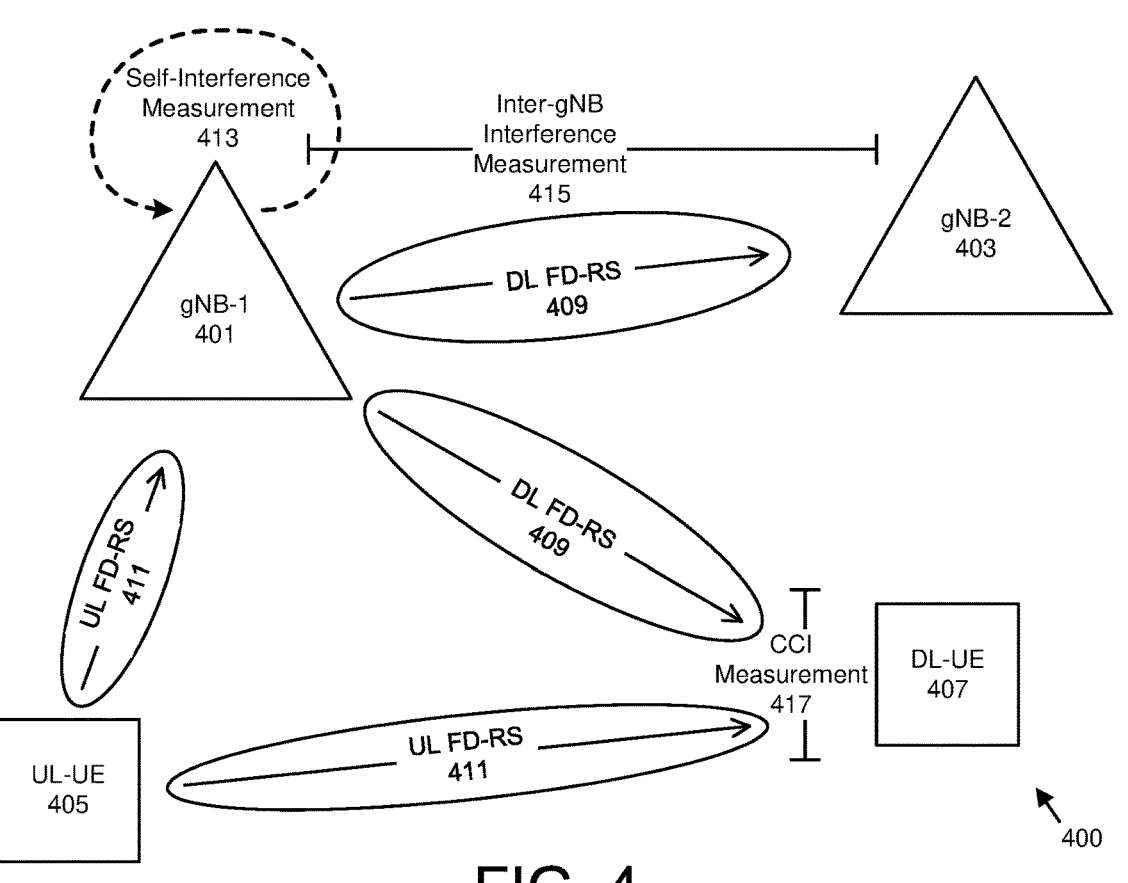
FIG. 4 is a diagram illustrating one embodiment of transmission of the downlink Full-Duplex Reference Signal ("DL FD-RS") and uplink Full-Duplex Reference Signal ("UL FD-RS") and the associated measurements.

FIG. 4 depicts one example for the transmission of the DL FD-RS and UL FD-RS and the associated measurements in a RAN 400, according to embodiments of the disclosure. The RAN 400 includes a first gNB 401 (e.g., one implementation of the base unit 121 and/or RAN node 207), a second gNB 403 (e.g., another implementation of the base unit 121 and/or RAN node 207), a UE 405 performing UL transmission (denoted as "UL-UE"), and a UE 407 performing DL reception (denoted as "DL-UE"). The measurements for an intended transmission are measured by setting relevant configurations for a set of DL FD-RS resources 409 and a set of UL FD-RS resources 411. As depicted, the first gNB 401 (denoted as "gNB-1") may perform self-interference measurements 413 and inter-gNB interference measurements 415. Additionally, the DL-UE 407 may perform CCI measurements 417.

In order to facilitate measurements associated with the interference paths appearing due to the concurrent transmission and reception at an FD-gNB, a pair of new reference signals are proposed. A measurement on an intended interference channel (or a group of interference channels) can be then performed by configuring/activating pair of DL FD-RS and UL FD-RS, wherein first UE or a first group of UEs are configured with UL FD-RS resources in time-frequency, QCL assumption, periodic/aperiodic/semi-persistent time behavior to transmit to the gNB and on same time-frequency resources (or a sub-set of the time resources), DL FD-RS is configured to a second UE or a second group of UEs on which these second group of UEs are expected to only measure interference received from the UL FD RS transmissions from the first group of UEs and not expected to receive any other DL channels/signals.

According to embodiments of the first solution, a gNB transmits a reference signal for Interference-Measurements via DL transmission, referred to as a DL full-duplex reference signals ("DL FD-RS"). The DL FD-RS is dedicated to the transmissions in DL with the goal of enabling interference measurements on different channels.

In some embodiments, gNB configures resources for DL FD-RS in a dynamic/aperiodic (configured by DCI), periodic or semi-persistent manner (via higher layer signaling). The dynamic assignment corresponds to a scenario where a user needs to be scheduled or re-scheduled (potentially with an FD channel resource) whereas the periodic and semi-static allocations facilitate evaluation of the interference level with the purpose of periodic monitoring of the interference.

In one implementation of the first solution, DL FD-RS can be zero-power ("ZP") or non-zero-power ("NZP"), i.e., as a ZP DL FD-RS or a NZP DL FD-RS, depending on the intended measurement's purpose. A ZP DL FD-RS, e.g., facilitates a measurement of the interference by the UE nodes at the assigned resources by DL FD-RS from the corresponding nodes with NZP UL FD-RS transmissions. A ZP DL FD-RS can be assigned to the resources corresponding to a single DL user, or to a group of DL users.

Similarly, NZP DL FD-RS can be assigned with the resources corresponding to a single or a group of DL users. The application is, e.g., to facilitate measurements simultaneously at multiple DL UEs from one or multiple UL UEs assigned with NZP DL FD-RS. Both ZP DL FD-RS and NZP DL FD-RS can be configured with adjustable activation times, in order to enable different phases of measurements and Rx filter tuning in a subsequent phase.

In some implementations of the first solution, the assignment of the DL FD-RS resources can coexist with the assignment of other DL transmissions at the same resource (transmissions of data and control information, transmissions of other reference signals). This exemplifies the case that the DL data transmission is also viewed as DL FD-RS, i.e., DL data transmission is re-used for the purpose of interference measurements, without use of additional dedicated resources. This exemplifies the case that the DL data transmission is also viewed as DL FD-RS, i.e., DL data transmission is re-used for the purpose of interference measurements, without use of additional dedicated resources.

NZP DL FD-RS may be used for adjusting the DL beam for data transmission such that the interference from UL UEs is minimized and/or for self-interference measurement/cancellation at gNB as well as for self-interference cancellation of the superimposed DL transmission of multiple UEs. NZP DL FD-RS can be configured to be transmitted using the configured DL communication beam (fine beam for the DL data transmission) or in a wider beam (wide beam or omnidirectional transmission from all antenna panels). This will facilitate different concepts of self-interference cancellation evaluations (UE-beam specific or non-UE-beam specific).

In some embodiments of the first solution, a group of UEs can receive RRC configuration to configure DL FD-RS to a group of UEs on same time-frequency resources and same multiplexing type. The QCL assumption included in the RRC configuration is default configuration for all UEs, however, UE-specific QCL assumption can be updated via DCI trigger and/or MAC CE (while other parameters may remain same as in RRC configuration).

In one implementation of the first solution, the timing behavior associated with DL FD-RS is periodic in nature. Once the RRC configures the periodic DL FD RS, then the UE is expected to measure interference received from corresponding UL FD-RS only when FD mode is applied at the gNB. The gNB can indicate to a group of UEs if the FD mode is enabled or not. Basically, this indication can be implicitly used to turn on/off the periodic DL FD-RS. When the UE is not indicated with DL FD-RS, then UE can expect to be scheduled with other channels/signals on the same resources.

In another implementation of the first solution, the timing behavior associated with DL FD-RS is semi-persistent in nature. Once the RRC configures the semi-persistent DL FD RS, the activation/deactivation of these semi-persistent resources can either be explicitly done or implicitly determined based on the indication of FD mode by the gNB. The gNB can indicate to a group of UEs if the FD mode is enabled or not. Basically, this indication can be implicitly used to activate/deactivate the semi-persistent DL FD-RS. When the UE is not indicated with FD mode by the gNB, then UE can expect to be scheduled with other channels/signals on the same resources.

In an embodiment of the first solution, the CSI reference resource (as defined in Technical Specification ("TS") 38.214) for a CSI reporting associated with a DL FD-RS is defined to be in a first slot, wherein the first slot is either a valid downlink slot as defined in TS 38.214 or a slot in which FD operation (e.g., by gNB) is allowed/configured/enabled (e.g., at least 'x' symbols are allowed to be used by the gNB for FD operation). In an example, 'x=1'. In another example, 'x' is determined based on a subcarrier spacing ("SCS") associated with a DL or UL transmission.

In a related implementation of the first solution, if there is no valid downlink slot for the CSI reference resource corresponding to the CSI Report Setting in a serving cell, CSI reporting is omitted for the serving cell in the corresponding uplink slot if the UE is not indicated with FD operation by the gNB (e.g., for a slot corresponding to the CSI reference resource).

In an example, if the UE that is indicated/informed about a gNB's FD operation, is indicated (e.g., in the CSI reference resource) to report CQI index, then the UE shall assume different assumptions for the purpose of deriving the CQI index compared to the assumptions for the purpose of deriving the CQI index when the UE is not indicated/informed about the gNB's FD operation. In certain embodiments, the assumptions for deriving CQI index are those listed in section 5.2.2.5 of TS 38.214, including assumptions on the number of OFDM symbols occupied by control signaling, number of PDSCH and DMRS symbols, PRB bundling size, etc. In an example, the UE assumes a smaller number than 12 for the number of PDSCH and DMRS symbols when the UE is aware of the gNB's FD operation (note that 12 is the assumption for CSI reference resource for Rel-16). In an example, some of the assumptions for CQI derivation on the CSI reference resource are configured, e.g., to account for potential UL transmissions.

According to embodiments of the first solution, a UE transmits a reference signal for Interference-Measurements via UL transmission, referred to as a UL full-duplex reference signals ("UL FD-RS"). The UL FD-RS is dedicated to the transmissions in UL with the goal of enabling interference measurements on different channels.

In some embodiments of the first solution, the gNB assigns resources for an UL FD-RS in a dynamic (configured by DCI), periodic and semi-persistent manner (via higher layer signaling). The use case for such assignments is similar to that of DL FD-RS. UL FD-RS can be assigned with ZP or NZP, i.e., as a ZP UL FD-RS or a NZP UL FD-RS, depending on the intended measurement's purpose. A ZP UL FD-RS, e.g., facilitates a measurement of the impact of self-interference (after potential application of self-interference cancellation methods by the gNB) at the assigned resources by UL FD-RS. ZP UL FD-RS can be assigned to the resources corresponding to a single UL user, or to a group of UL users. The application is, e.g., to facilitate measurements of interference at the FD-gNB from other transmissions (e.g., self-interference or inter-gNB interference). ZP UL FD-RS and/or NZP UL FD-RS can be configured with adjustable activation times, in order to enable different phases of measurements and Rx filter tunning in a subsequent phase.

In some implementations of the first solution, an uplink resource can be jointly assigned to an UL FD-RS as well as for the UL data or control information (e.g., PUSCH, PUCCH). This exemplifies the case that the UL data transmission is re-used for the purpose of interference measurements, without use of additional dedicated resources for UL FD-RS. In some instances of the aforementioned implementation, the UE may use the awareness of the co-assignment of UL transmissions with the UL FD-RS to impose some restrictions on the transmitted waveform (e.g., to enable reliable data-aided interference measurements or CSI esti-mation methods). NZP UL FD-RS can be configured to transmit in the configured UL communication beam (fine beam) or in a wider beam (wide beam or omnidirectional transmission from all antenna panels).

In an embodiment of the first solution, a UE may receive information of UL waveform (e.g., Orthogonal Frequency-Division Multiplexing ("OFDM"), precoded-OFDM) to apply when transmitting an UL channel (e.g., Physical Uplink Shared Channel ("PUSCH"), Physical Uplink Con-trol Channel ("PUCCH")) in the FD-gNB's region of opera-tion. The UE may further receive an indication that a scheduled uplink transmission is in the FD-gNB's operation region and may apply a waveform configured for the FD operation. Alternatively, an UL waveform applicable to the FD-gNB's FD operation may be predefined.

In an embodiment of the first solution, a UE may receive configuration information of one or more ZP UL FD-RS resources (or one or more ZP SRS resources) in an UL bandwidth part ("BWP"). Further, when the UE transmits an UL channel in the UL BWP, where a resource of the UL channel includes at least one resource element overlapping with a ZP UL FD-RS resource of the one or more configured ZP UL FD-RS resources (or an SRS resource of the one or more SRS resources), the UE performs rate matching of the UL channel around the at least one resource element over-lapping with the ZP UL FD-RS resource (or the ZP SRS resource). In an example, gNB performs self-interference and/or gNB-to-gNB interference measurements on the one or more ZP UL FD-RS resources configured for the UE. In another example, the UE transmitting the UL channel is a first UE, and gNB configures a second UE with an SRS resource corresponding to the ZP SRS resource of the first UE for SRS transmission and configures a third UE with the SRS resource corresponding to the ZP SRS resource of the first UE for cross-link interference ("CLI") measurement.

In an embodiment of the first solution, a UE may receive configuration information of one or more ZP CSI-RS resources in a DL BWP. Further, when the UE transmits an UL channel in an UL BWP associated with the DL BWP, where a resource of the UL channel includes at least one resource element overlapping with a ZP CSI-RS resource of the one or more configured ZP CSI-RS resources, the UE performs rate matching of the UL channel around the at least one resource element overlapping with the ZP CSI-RS resource, if configured (or if indicated). In one example, in unpaired spectrum, the UL BWP has a center frequency same as a center frequency of the associated DL BWP. The UE may be informed, via DCI or RRC configuration, of gNB's FD operation and accordingly rate-matching of the UL channel around the ZP CSI-RS resource.

In another implementation of the first solution, FD opera-tion could be configured to be enabled/disabled per BWP and FD operation could be configured to be enabled/disable either DL BWP or UL BWP. In another implementation of the first solution, FD operation is configured to be enabled/disabled only in the initial BWP and in another implemen-tation of the first solution, FD is configured to be enabled/disabled in a dedicated BWP. In another implementation of the first solution, UE expect that the DL and UL numerology such as SCS, CP to be same/similar when configured to be enabled for a FD operation.

In some embodiments of the first solution, UE could be configured with a separate Transmission Configuration Indi-cator ("TCI") table that is common for both DL and UL, when a UE is dynamically indicated for a FD operation, UE could autonomously switch to a separate TCI table without any explicit indication otherwise UE is (pre)configured to be switched to a separate TCI table when enabled dynamically for a FD operation. In some embodiments of the first solution, UE could be semi statically configured with a FD operation parameter such as BWP, TCI table, etc.

In some embodiments of the first solution, a group of UEs can receive RRC configuration to configure UL FD-RS to a group of UEs on same time-frequency resources and same multiplexing type. The Quasi-Co-Location ("QCL") assumption included in the RRC configuration/group com-mon Downlink Control Information ("DCI") is default con-figuration for all UEs, however, UE-specific QCL assump-tion can be updated via DCI trigger and/or MAC CE (while other parameters may remain same as in RRC con-figuration).

In one implementation, the timing behavior associated with UL FD-RS is periodic in nature. Once the RRC configures the periodic UL FD RS, then the UE is expected to transmit the UL FD-RS. The gNB can indicate to a group of UEs if the FD mode is enabled or not. Basically, this indication can be implicitly used to turn on/off the periodic UL FD-RS. When the UE is not indicated with UL FD-RS, then UE can expect to be scheduled with other channels/signals on the same resources.

In another implementation, the timing behavior associated with UL FD-RS is semi-persistent in nature. Once the RRC configures the semi-persistent UL FD RS, the activation/deactivation of these semi-persistent resources can either be explicitly done or implicitly determined based on the indi-cation of FD mode by the gNB. The gNB can indicate to a group of UEs if the FD mode is enabled or not. Basically, this indication can be implicitly used to activate/deactivate the semi-persistent UL FD-RS. When the UE is not indicated with FD mode by the gNB, then UE can expect to be scheduled with other channels/signals on the same resources.

According to embodiments of the second solution CCI measurement will take place at a single or potentially a group of DL UEs when configured with ZP DL FD-RS in combination with the transmission from a single (or poten-tially a group) of UL UEs configured with NZP UL FD-RS resources.

In some embodiments of the second solution, UL users of the same cell can be also configured with ZP UL FD-RS in order to facilitate interference measurements caused by the UEs which are outside of the selected group (for interference monitoring) by the gNB, or the inter-cell interference mea-surements.

In another instance of the previous embodiment, ZP UL FD-RS can be configured to a single or a group of UL resources, simultaneously as the UL UEs are assigned with data communication, whereas ZP DL FD-RS is configured for a group of DL UE resources. This facilitates the CCI measurements using the data communication phase.

In some implementations of the second solution, NZP UL FD-RS can be assigned to a single UL UE whereas a ZP DL FD-RS is assigned to a group of candidate DL UEs which are potential interference victims. An example use-case would be when an UL user needs to be scheduled or re-scheduled. The NZP UL FD-RS in this case may be configured with a wide-beam to evaluate CCI in all direc-tions or allow CSI measurements. In another implementa-tion of the second solution, the UL UE is configured with NZP UL FD-RS with multiple beams in different directions to be measured by DL UEs and reported to the gNB to allow the gNB to adjust the UL beam such that the interference to DL UEs is minimized.

In some implementations of the second solution, NZP UL FD-RS can be assigned to a group of UL UE whereas a ZP DL FD-RS is assigned to a single DL UE or a group of candidate DL UEs which are potential interference victims. An example use case would be when a DL UE needs to be scheduled or re-scheduled on a potentially FD resource.

In both two aforementioned implementations, the DL UEs may be asked to use the beam specific to DL reception (i.e., fine beam), or an omnidirectional beam. The first case has the capability to measure interference on the actual beam settings used for communication, whereas the second one provides information on interference in different spatial directions, which can be later used for beam refinement with the awareness of CCI impact.

Regarding Implicit CCI measurements, UEs may be configured to measure the interference received at the resources outside of their configured DL reception. This will not be an instance of explicit CCI measurement for the UE, however, will enable gNB of inferring the network interference conditions with higher accuracy and less NZP UL FD-RS/DL resources, when used together with the DL UE location and/or beam information.

In some implementations of the second solution, UEs may be configured to measure interference with different SCS in one of the configured BWP apart from the active BWP. In another implementation of the second solution, if a UE supports transmission from multiple active BWPs, then a UE is configured to measure interference (e.g., inter BWP interference which arise with insufficient guard band and power levels) from a second active BWP when it is performing transmission/reception in a first active BWP and interference ZP-RS configuration to measure second BWP is configured as part of the first BWP.

In another implementation of the second solution, ZP-RS signals are placed at the beginning and/or edge PRBs (e.g., 'N' number of PRBs in each BWP are configured for a ZP-RS), of a BWP depending on the location of BWP with respect to the neighboring BWP. Moreover, UEs may be asked to measure interference within the configured but not active BWPs. In some implementations of the second solution, UEs may or may not participate in the implicit CCI measurements. In some implementations of the second solution, providing such additional measurements may be incentivized by enabling/prioritizing FD resource assignments to the UEs.

In some implementations of the second solution, group of closely located UEs can be configured to perform implicit CCI measurements. The activation of the measurements can be hence triggered when one or more of the associated group members are a candidate for CCI measurements. In an implementation of the same embodiment, during CCI measurements for a DL UE (denoted "UE 1"), the gNB may configure a closely-located UE (denoted "UE 2"), or potentially a group of UEs, to participate in CCI measurements for UE 1, when UE 2 is not assigned with the associated CCI resource (nor for transmission or reception).

In some embodiments of the second solution, FD operations could be configured to be enabled in a DL BWP and/or UL BWP which could be partially overlapped in the frequency domain and in one or more embodiments discussed in this disclosure is equally applicable for such cases.

According to embodiments of the second solution, UEs may be configured to report the resulting measurements with the following configurations, or some configuration thereof:

Dynamic reporting: in some embodiments, the measured CCI (or implicit CCI measurements) shall be reported to the gNB upon the conclusion of the measurements or upon triggering the reporting request. This is corresponding to the dynamic configuration of UL FD-RS and DL FD-RS for CCI measurements.

Periodic reporting: in some embodiments, UE will report the CCI measurements (or implicit CCI measurements) at a periodically configured UL resources. This is corresponding to the periodic configuration of UL FD-RS and DL FD-RS for CCI measurements or to the scenario when dynamic measurement requests will not be reported upon completion.

Blind reporting: in some embodiments, the content of the measured CCI will not be interpreted by UE. However, UE may compress the measurements.

Learning-based reporting: The UE is configured with a computational strategy to infer desired characteristics from CCI measurements or implicit CCI measurements. An example is to report the CCI measurements only on the Rx spatial filters where the interference reaches a threshold.

In some embodiments of the second solution, UEs may be configured to report other meaningful information in addition to the measurement data. This includes, e.g., the location information. In some embodiments of the second solution, and for a specific type of the CCI measurements, a dedicated resource can be configured for CCI measurement (or implicit CCI measurements) reporting.

In some embodiments of the second solution, at least one new reporting quantity is introduced can be configured to the UEs to report interference (statistics) related to FD mode interference measurement. In one implementation of the second solution, each UE within a group is configured with UE-specific reporting configuration that includes at least the time-frequency resources, PUSCH/PUCCH configuration, time-domain behavior of reporting and set of DL FD-RS on which measurements are performed and the reporting quantities.

In another implementation of the second solution, a group of UEs are configured with a common configuration/indication for at least the reporting quantity, but other configuration parameters can be UE-specifically configured. In this case, all the UEs are expected to report the same quantity to the network.

In an embodiment of the second solution, a group-common (GC) DCI is used to trigger a dynamic report. A field in the GC-DCI, referred to as FD-RS trigger, may:

trigger a first set of UEs to prepare a-periodic CSI report on a set of configured DL FD-RS associated with the triggered configured CSI report, and trigger a second set of UEs to transmit UL FD-RS a set of configured UL FD-RS associated with the triggered configured UL FD-RS configuration.

The GC-DCI comprises 'N' FD-RS trigger fields. A trigger field can be composed of two subfields: trigger-ID, and a bit indicating UL or DL. A UE is configured with one or more FD-RS trigger fields.

The UE upon reception of the GC-DCI, checks if any of the configured FD-RS trigger fields with which the UE is configured, is indicated in the GC-DCI; in response to such determination, the UE determines if it is triggered to send UL FD-RS or if it is triggered to prepare a-periodic CSI report. The UE performs the determined action according to the timeline of the corresponding action.

According to embodiments of the second solution, the UL FD-RS and NZP DL FD-RS can be configured simultaneously for a group of UL and DL UEs. Beneficially, this would allow the DL UEs to adjust their Rx beams in order to reject CCI.

In some implementations of the second solution, the scheduled UL Tx power are adjusted to minimize CCI over the FD resources. In one implementation of the second solution, a separate open loop power control parameters, e.g., P0 and alpha could be configured for the purpose of FD operation, and when a UE is dynamically indicated for a FD operation or a UL transmission in a DL resource, UE could implicitly switch to the one of the configured open loop parameter for FD: In another implementation of the second solution, UE could be semi-statically configured for an open loop parameter that is applicable during time duration of FD operation. In another implementation of the second solution, UL transmit power is adapted after measuring the DL interference.

In some implementations of the second solution, the scheduled users within the UL resources, UL Tx power as well as the Rx filters are adjusted such that to enable successive interference decoding and cancellation at UEs which are subject to CCI.

In some embodiments of the second solution, the ZP DL FD-RS may be scheduled to automatically convert to a NZP DL FD-RS after a given period of time. In some embodiments of the second solution, a ZP DL FD-RS is scheduled to convert to NZP UL FD-RS after a given period of time. The intension is to allow the DL UEs to adjust their Rx beams in order to reject CCI.

In some embodiments of the second solution, UEs may measure interference level over all resources which are either indicated by the gNB, or the interference measured by subtracting the decoded data stream and measuring the remaining signal power, and use third information in order to adjust their transmit power. UEs in the environment with a higher interference level, may decide to increase their Tx power to achieve the required QoS, or to reduce their Tx power to decrease the network interference situation.

In some embodiments of the second solution, the UE can be configured to measure interference on multiple beams (i.e., DL FD RS can be associated with multiple QCL type-D assumption) and report only the beams where the interference is below a network configured threshold value.

According to embodiments of the third solution, a FD-gNB facilitates self-interference measurements to mitigate interference appearing due to the FD operation at gNB. The purpose of self-interference measurements is to evaluate the residual interference impact associated with FD operation at the gNB, for a specific configuration of Tx and Rx antenna ports (associated with DL transmission and UL reception at the gNB) and a specific resource location.

In some embodiments of the third solution, the gNB may configure NZP DL FD-RS to a single or multiple DL UEs, simultaneous to the UL data communication or ZP UL FD-RS or NZP UL FD-RS to UL UEs, to probe the impact of self-interference at the specific antenna/resource setting. In some embodiments of the third solution, the gNB may indicate that the NZP DL FD-RS may or may not be utilized for the purpose of CSI measurements in the DL.

In some embodiments of the third solution, the gNB can indicate ZP DL FD-RS and NZP UL FD-RS to measure the interference on DL resources, when an UL reception is performed at the gNB on same time-frequency resources. In some embodiments of the third solution, the self-interference interference is measured on multiple UL and DL beams at the gNB and based on the measurements, gNB determines the least interfering pair of DL and UL beams.

Figure 5:
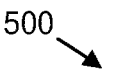
FIG. 5 is a diagram illustrating one embodiment of zero-power ("ZP") UL FD-RS for gNB Self-Interference Measurement and/or Self-Interference Cancellation for half-duplex UEs operating in Frequency-Division Duplex ("FDD")

FIG. 5 depicts a table 500 of examples of different duplexing modes and corresponding frequency and time use, according to embodiments of the disclosure. For FDD mode, a first portion of the frequency band is used for uplink ("UL") transmission and a second portion of the frequency band is used for downlink ("DL") transmission. For pure FDD mode, no distinction is made in the time domain between UL and DL transmissions, meaning that UL and DL transmissions may be performed simultaneously using the same time resources. In some embodiments, a duplex gap (i.e., guard band) exists in the frequency band separating UL frequencies from DL frequencies (i.e., to mitigate/prevent inter-carrier interference).

For TDD mode, a first portion of the time domain (i.e., a first time slot or first set of time slots) is used for UL transmission and a second portion of the time domain (i.e., a second time slot or second set of time slots) is used for DL transmission. For pure TDD mode, no distinction is made in the frequency domain between UL and DL transmissions, meaning that UL and DL transmissions may be performed across the entire frequency band, i.e., using the same frequency resources. In some embodiments, a guard period (i.e., time gap) exists in the time domain separating UL time slots from DL time slots (i.e., to mitigate/prevent inter-slot interference).

FDD and TDD are examples of half-duplex operation. In contrast, for Full Duplex ("FD") mode UL and DL transmissions may be performed across the entire frequency band, i.e., using the same frequency resources, and also using the same time resources. Note that some wireless communication systems employ combinations of FDD and TDD principles, i.e., separating UL and DL transmissions in both time and frequency.

Figure 6:
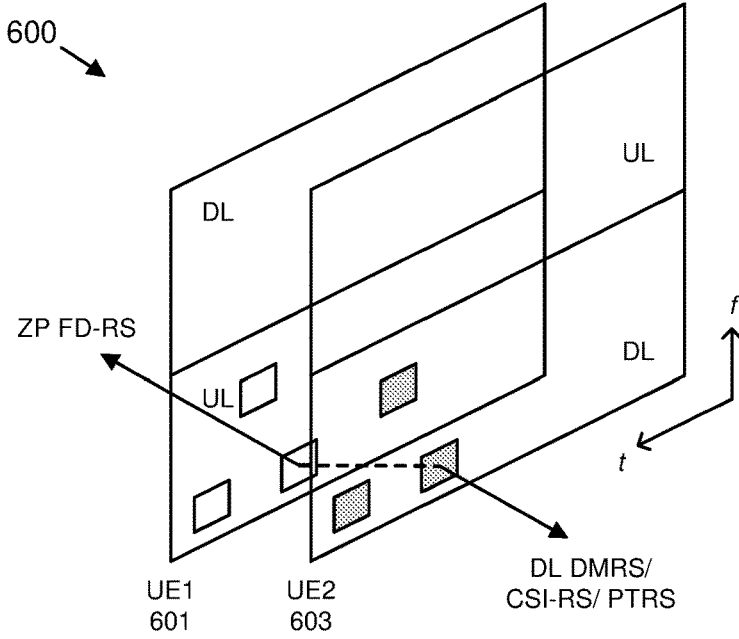
FIG. 6 is a diagram illustrating one embodiment of ZP UL FD-RS for gNB Self-Interference Measurement and/or Self-Interference Cancellation for half-duplex UEs operating in Time-Division Duplex ("TDD")

FIG. 6 depicts an arrangement 600 of time-frequency resources for self-interference measurement and cancellation, according to embodiments of the disclosure. The arrangement 600 includes resources of a first half-duplex UE 601 (denoted as "UE1") operating in FDD and a second half-duplex UE 603 (denoted as "UE2") also operating in FDD. As depicted, the first UE 601 is configured with DL resources in the frequency domain that correspond to configured UL resources of the second UE 603. Similarly, the second UE 603 is configured with DL resources in the frequency domain that correspond to configured UL resources of the first UE 601. Moreover, the first UE 601 is configured with a set of ZP UL FD-RS resources that overlap in time and frequency with a set of DL reference signals ("RS") configured to the second UE 603 (e.g., Demodulation Reference Signal ("DMRS"), CSI-RS, Phase-Tracking Reference Signal ("PTRS"), etc.). As described in greater detail below, the configured ZP UL FD-RS may be used by the RAN for gNB self-interference measurement.

Figure 7:
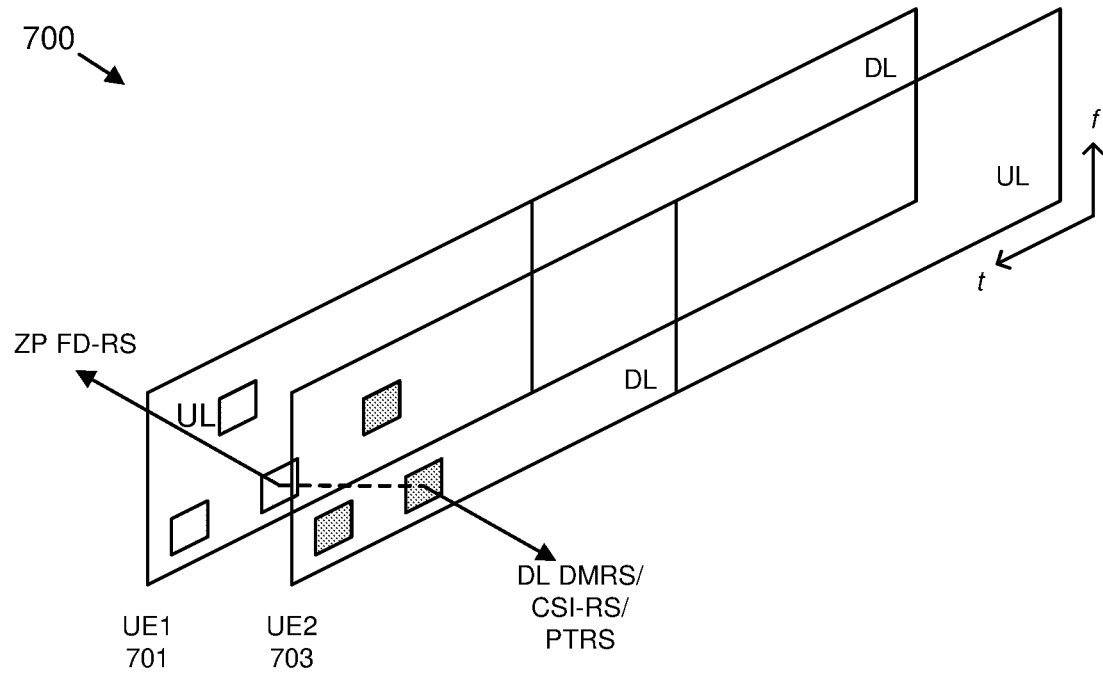
FIG. 7 is a diagram illustrating one embodiment of ZP UL FD-RS for gNB Self-Interference Measurement and/or Self-Interference Cancellation for a full-duplex UE.

FIG. 7 depicts an arrangement 700 of time-frequency resources for self-interference measurement and cancellation, according to embodiments of the disclosure. The arrangement 700 includes resources of a first half-duplex UE 701 (denoted as "UE1") operating in TDD and a second half-duplex UE 703 (denoted as "UE2") also operating in TDD. As depicted, the first UE 701 is configured with DL resources in the time domain that correspond to configured UL resources of the second UE 703. Similarly, the second UE 703 is configured with DL resources in the time domain that correspond to configured UL resources of the first UE 701. Moreover, the first UE 701 is configured with a set of ZP UL FD-RS resources that overlap in time and frequency with a set of DL reference signals ("RS") configured to the second UE 703 (e.g., DMRS, CSI-RS, PTRS, etc.). As described in greater detail below, the configured ZP UL FD-RS may be used by the RAN for gNB self-interference measurement.

Figure 8:
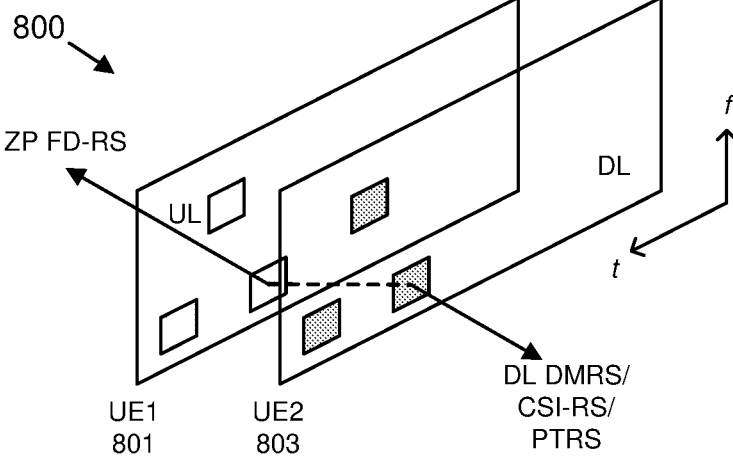
FIG. 8 is a block diagram illustrating one embodiment of a user equipment apparatus that may be used for interference management for full-duplex operation.

FIG. 8 depicts an arrangement 800 of time-frequency resources for self-interference measurement and cancellation, according to embodiments of the disclosure. The arrangement 800 includes resources of a first UE 801 (denoted as "UE1") operating in full-duplex mode and a second UE 803 (denoted as "UE2") also operating in full-duplex mode. As depicted, the first UE 801 is configured with DL resources that correspond to configured UL resources of the second UE 803. Similarly, the second UE 803 is configured with DL resources that correspond to configured UL resources of the first UE 801. Moreover, the first UE 801 is configured with a set of ZP UL FD-RS resources that overlap in time and frequency with a set of DL reference signals ("RS") configured to the second UE 803 (e.g., DMRS, CSI-RS, PTRS, etc.). As described in greater detail below, the configured ZP UL FD-RS may be used by the RAN for gNB self-interference measurement.

In some embodiments, in order to estimate the channel between the Tx and Rx antennas at the gNB for self-interference cancellation in the baseband, the gNB configures UL UEs with ZP FD-RS associated with the usual DL DMRS/CSI-RS/PTRS. For half-duplex UEs, the UL UE receives in DCI bit map for the resources to be muted in its UL slot associated with the same resource allocated for DL DMRS/CSI-RS/PTRS of other UEs. For full duplex UE, the UE receives indication in DCI to mute the resources of its DL DMRS/CSI-RS/PTRS as shown in FIGS. 6-8. UL MCS and other rate-matcher parameters are configured based on the number of muted UL resources. The number and the port of the muted DL RS resources for self-interference measurements are selected based on the spatial difference/relation between the Tx and Rx antenna at the gNB for a given UL/DL slots.

According to embodiments of the fourth solution, a FD-gNB may facilitate inter-gNB interference measurements to mitigate interference appearing due to the FD operation at gNB. The purpose of inter-gNB interference measurements is to enable measurements on the CSI and the interference level among the adjacent gNBs operating in FD mode.

In some implementations, gNBs can be configured with NZP DL FD-RS (on one cell) and ZP UL FD-RS (on another cell) to facilitate CSI measurements.

In some implementations, when gNBs are jointly connected to a central processing node or are inter-connected via backhaul, the obtained CSI can be utilized to estimate and subtract interference the inter-gNB interference.

In some implementations, the NZP DL FD-RS (on the first cell) can co-exist with ZP UL FD-RS for some UL users (on the second cell) together with the data UL communications for some other UEs (on the second cell). This is to be scheduled such that, e.g., the successive interference cancellation of the UL channels is ensured, enabling CSI measurements for inter-gNB interference after decoding and subtracting the UL data from the received signal, or the UL users can be scheduled with spatial beams such that the received signal at the gNB does not interfere with the intended estimation of the inter-gNB CSI estimation. In both implementations, the UL UEs resources are to be configured by the gNB in accordance with the intended interference reduction concept during the inter-gNB CSI estimation.

When the Reference Signal for Interference Measurement ("RS-IM") signals may not be dynamically configured (due to the lack of coordination among the gNBs), a periodic configuration of the corresponding NZP DL FD-RS and ZP UL FD-RS can be used.

In some implementations, the DL UEs can be also configured with ZP DL FD-RS (simultaneous to ZP UL FD-RS) in order to listen and measure the interference from the neighbor gNB. Alternatively, in some implementations, the UL UEs can be also configured at one cell with ZP UL FD-RS (simultaneous to NZP DL FD-RS in an adjacent cell) in order to enable interference measurements from the UL UEs to the gNB of the adjacent cell. The UEs may or may not be configured to report the measured CSI to their serving gNB.

The procedures on aperiodic Channel state information ("CSI") reporting described in this clause assume that the CSI reporting is triggered by DCI format 0_1, but they equally apply to CSI reporting triggered by DCI format 0_2, by applying the higher layer parameter "reportTriggerSizeDCI-0-2" instead of the parameter 'reportTriggerSize.'

The time and frequency resources that can be used by the UE to report CSI are controlled by the gNB. The CSI may consist of Channel Quality Indicator ("CQI"), precoding matrix indicator ("PMI"), CSI-RS resource indicator ("CRI"), SS/PBCH Block Resource indicator ("SSBRI"), transmission layer indicator ("LI"), rank indicator ("RI"), Layer-1 Reference Signal Received Power ("L1-RSRP"), or Layer-1 Signal-to-Interference-plus-Noise Ratio ("L1-SINR").

For CQI, PMI, CRI, SSBRI, LI, RI, L1-RSRP, L1-SINR a UE is configured by higher layers with $N{\geq}1$ 'CSI-ReportConfig' Reporting Settings, $M{\geq}1$ 'CSI-ResourceConfig' Resource Settings, and one or two list(s) of trigger states (given by the higher layer parameters 'CSI-AperiodicTriggerStateList' and 'CSI-SemiPersistentOnPUSCH-TriggerStateList'). Each trigger state in parameter 'CSI-AperiodicTriggerStateList' contains a list of associated 'CSI-ReportConfg' reporting settings indicating the Resource Set Identifiers ("IDs") for channel and optionally for interference. Each trigger state in parameter 'CSI-SemiPersistentOnPUSCH-TriggerStateList' contains one associated 'CSI-ReportConfig.'

Each Reporting Setting 'CSI-ReportConfig' is associated with a single downlink BWP (indicated by higher layer parameter BWP-Id) given in the associated 'CSI-ResourceConfig' for channel measurement and contains the parameter(s) for one CSI reporting band: codebook configuration including codebook subset restriction, time-domain behavior, frequency granularity for CQI and PMI, measurement restriction configurations, and the CSI-related quantities to be reported by the UE such as the (transmission) layer indicator ("LI"), L1-RSRP, L1-SINR, CRI, and SS/PBCH Resource Indicator ("SSBRI")

The time domain behavior of the 'CSI-ReportConfig' is indicated by the higher layer parameter 'reportConfigType' and can be set to 'aperiodic,' 'semiPersistentOnPUCCH, ''semiPersistentOnPUSCH,' or 'periodic.' For 'periodic,' 'semiPersistentOnPUCCH' and 'semiPersistentOnPUSCH' CSI reporting, the configured periodicity and slot offset applies in the numerology of the UL BWP in which the CSI report is configured to be transmitted on. The higher layer parameter 'reportQuantity' indicates the CSI-related, L1-RSRP-related, or L1-SINR-related quantities to report. The parameter 'reportFreqConfiguration' indicates the reporting granularity in the frequency domain, including the CSI reporting band and if PMI/CQI reporting is wideband or sub-band.

The parameter 'timeRestrictionForChannelMeasurements' in 'CSI-ReportConfig' can be configured to enable time domain restriction for channel measurements and the parameter 'timeRestrictionForInterferenceMeasurements' can be configured to enable time domain restriction for interference measurements. The 'CSI-ReportConfig' can also contain 'CodebookConfig,' which contains configuration parameters for Type-I, Type-II or Enhanced Type-II CSI including codebook subset restriction, and configurations of group-based reporting.

Each CSI Resource Setting 'CSI-ResourceConfig' contains a configuration of a list of S≥1 CSI Resource Sets (given by higher layer parameter 'csi-RS-ResourceSetList'), where the list is comprised of references to either or both of NZP CSI-RS resource set(s) and Synchronization Signal/Physical Broadcast Channel ("SS/PBCH") block set(s) or the list is comprised of references to Channel State Information for Interference Measurement ("CSI-IM") resource set(s). Each CSI Resource Setting is located in the DL BWP identified by the higher layer parameter BWP-id, and all CSI Resource Settings linked to a CSI Report Setting have the same DL BWP.

The time domain behavior of the CSI-RS resources within a CSI Resource Setting are indicated by the higher layer parameter 'resourceType' and can be set to aperiodic, periodic, or semi-persistent. For periodic and semi-persistent CSI Resource Settings, the number of CSI-RS Resource Sets configured is limited to S=1. For periodic and semi-persistent CSI Resource Settings, the configured periodicity and slot offset is given in the numerology of its associated DL BWP, as given by BWP-ID. When a UE is configured with multiple report settings 'CSI-ResourceConfig' consisting of the same non-zero power ("NZP") CSI-RS resource Identifier ("ID"), the same time domain behavior shall be configured for the report settings 'CSI-ResourceConfig.' When a UE is configured with multiple report settings 'CSI-ResourceConfig' consisting of the same CSI-IM resource ID, the same time-domain behavior shall be configured for the report settings 'CSI-ResourceConfig.' All CSI Resource Settings linked to a CSI Report Setting shall have the same time domain behavior.

The following are configured via higher layer signaling for one or more CSI Resource Settings for channel and interference measurement: A) CSI-IM resource for interference measurement; B) NZP CSI-RS resource for interference measurement; and C) NZP CSI-RS resource for channel measurement. One example of a CSI-IM resource is described in Clause 5.2.2.4 from 3GPP TS 38.214. Another example of a CSI-IM resource is described in Clause 5.2.2.3.1 from 3GPP TS 38.214.

The UE may assume that the NZP CSI-RS resource(s) for channel measurement and the CSI-IM resource(s) for interference measurement configured for one CSI reporting are resource-wise Quasi-Co-Located ("QCL'ed") with respect to value 'typeD.' When NZP CSI-RS resource(s) is used for interference measurement, the UE may assume that the NZP CSI-RS resource for channel measurement and the CSI-IM resource or NZP CSI-RS resource(s) for interference measurement configured for one CSI reporting are QCL'ed with respect to value 'typeD.'

For L1-SINR measurement, when one Resource Setting is configured, the Resource Setting (given by higher layer parameter 'resourcesForChannelMeasurement') is for channel and interference measurement on NZP CSI-RS for L1-SINR computation. The UE may assume that same 1 port NZP CSI-RS resource(s) with density 3 REs/RB is used for both channel and interference measurements.

When two Resource Settings are configured, the first one Resource Setting (given by higher layer parameter 'resourcesForChannelMeasurement') is for channel measurement on Synchronization Signal Block ("SSB") or NZP CSI-RS and the second one (given by either higher layer parameter 'csi-IM-ResourcesForInterference' or higher layer parameter 'nzp-CSI-RS-ResourcesForInterference') is for interference measurement performed on CSI-IM or on 1 port NZP CSI-RS with density 3 REs/RB, where each SSB or NZP CSI-RS resource for channel measurement is associated with one CSI-IM resource or one NZP CSI-RS resource for interference measurement by the ordering of the SSB or NZP CSI-RS resource for channel measurement and CSI-IM resource or NZP CSI-RS resource for interference measurement in the corresponding resource sets. The number of SSB(s) or CSI-RS resources for channel measurement equals to the number of CSI-IM resources or the number of NZP CSI-RS resource for interference measurement.

UE may apply the SSB, or 'typeD' RS configured with parameter 'qcl-Type' set to value 'typeD' to the NZP CSI-RS resource for channel measurement, as the reference RS for determining 'typeD' assumption for the corresponding CSI-IM resource or the corresponding NZP CSI-RS resource for interference measurement configured for one CSI reporting. The UE may expect that the NZP CSI-RS resource set for channel measurement and the NZP-CSI-RS resource set for interference measurement, if any, are configured with the higher layer parameter repetition.

Regarding reporting configurations, the UE shall calculate CSI parameters (if reported) assuming the following dependencies between CSI parameters (if reported): the LI shall be calculated conditioned on the reported CQI, PMI, RI and CRI; the CQI shall be calculated conditioned on the reported PMI, RI and CRI; the PMI shall be calculated conditioned on the reported RI and CRI; and the RI shall be calculated conditioned on the reported CRI.

The reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic. Table 5.2.1.4-1 from 3GPP TS 38.214 describes the supported combinations of CSI Reporting configurations and CSI-RS Resource configurations and how the CSI Reporting is triggered for each CSI-RS Resource configuration. Periodic CSI-RS is configured by higher layers. Semi-persistent CSI-RS is activated and deactivated as described in Clause 5.2.1.5.2 from 3GPP TS 38.214. Aperiodic CSI-RS is configured and triggered/activated as described in Clause 5.2.1.5.1 from 3GPP TS 38.214.

Regarding Channel State Information Reference Signal ("CSI-RS"), more particularly NZP CSI-RS, the UE can be configured with one or more NZP CSI-RS resource set configuration(s) as indicated by the higher layer parameters 'CSI-ResourceConfig' and 'NZP-CSI-RS-ResourceSet.' Each NZP CSI-RS resource set consists of K≥1 NZP CSI-RS resource(s).

The following parameters for which the UE shall assume non-zero transmission power for CSI-RS resource are configured via the higher layer parameters 'NZP-CSI-RS-Resource,' 'CSI-ResourceConfig' and 'NZP-CSI-RS-ResourceSet' for each CSI-RS resource configuration: A) parameter 'nzp-CSI-RS-ResourceId' determines CSI-RS resource configuration identity; B) parameter 'periodicityAndOffset' defines the CSI-RS periodicity and slot offset for periodic/semi-persistent CSI-RS (all the CSI-RS resources within one set are configured with the same periodicity, while the slot offset can be same or different for different CSI-RS resources); C) parameter 'resourceMapping' defines the number of ports, CDM-type, and OFDM symbol and subcarrier occupancy of the CSI-RS resource within a slot that are given in Clause 7.4.1.5 of 3GPP TS 38.211; D) parameter 'nrofPorts' in 'resourceMapping' defines the number of CSI-RS ports, where the allowable values are given in Clause 7.4.1.5 of 3GPP TS 38.211; E) parameter 'density' in 'resourceMapping' defines CSI-RS frequency density of each CSI-RS port per PRB, and CSI-RS PRB offset in case of the density value of ½, where the allowable values are given in Clause 7.4.1.5 of 3GPP TS 38.211 (for density ½, the odd/even PRB allocation indicated in density is with respect to the common resource block grid); F) parameter 'cdm-Type' in 'resourceMapping' defines Code Division Multiplexing ("CDM") values and pattern, where the allowable values are given in Clause 7.4.1.5 of 3GPP TS 38.211; G) parameter 'powerControlOffset': which is the assumed ratio of PDSCH Energy Per Resource Element ("EPRE") to NZP CSI-RS EPRE when UE derives CSI feedback and takes values in the range of [−8, 15] dB with 1 dB step size; H) parameter 'powerControlOffsetSS': which is the assumed ratio of NZP CSI-RS EPRE to SS/PBCH block EPRE; I) parameter 'scrambling-D' defines scrambling ID of CSI-RS with length of 10 bits; J) parameter 'BWP-Id in CSI-ResourceConfig' defines which bandwidth part the configured CSI-RS is located in; K) parameter 'repetition' in 'NZP-CSI-RS-ResourceSet' is associated with a CSI-RS resource set and defines whether UE can assume the CSI-RS resources within the NZP CSI-RS Resource Set are transmitted with the same downlink spatial domain transmission filter or not as described in Clause 5.1.6.1.2 from 3GPP TS 38.214 and can be configured only when the higher layer parameter 'reportQuantity' associated with all the reporting settings linked with the CSI-RS resource set is set to 'cri-RSRP', 'cri-SINR' or 'none'; L) parameter 'qcl-InfoPeriodicCSI-RS' contains a reference to a TCI-State indicating QCL source RS(s) and QCL type(s) (if the TCI-State is configured with a reference to an RS configured with parameter 'qcl-Type' set to 'typeD' association, that RS may be an SS/PBCH block located in the same or different CC/DL BWP or a CSI-RS resource configured as periodic located in the same or different CC/DL BWP); M) parameter 'trs-Info' in 'NZP-CSI-RS-Resource-Set' is associated with a CSI-RS resource set and for which the UE can assume that the antenna port with the same port index of the configured NZP CSI-RS resources in the 'NZP-CSI-RS-ResourceSet' is the same as described in Clause 5.1.6.1.1 from 3GPP TS 38.214 and can be configured when reporting setting is not configured or when the higher layer parameter 'reportQuantity' associated with all the reporting settings linked with the CSI-RS resource set is set to 'none'.

All CSI-RS resources within one set are configured with same values for parameters 'density' and 'nrofPorts,' except for the NZP CSI-RS resources used for interference measurement. The UE expects that all the CSI-RS resources of a resource set are configured with the same starting RB and number of RBs and the same value of parameter 'cdm-type.'

The bandwidth and initial common resource block ("CRB") index of a CSI-RS resource within a BWP, as defined in Clause 7.4.1.5 of 3GPP TS 38.211, are determined based on the higher layer parameters 'nrofRBs' and 'starting-RB', respectively, within the Information Element ("IE") 'CSI-FrequencyOccupation' configured by the higher layer parameter 'freqBand' within the IE 'CSI-RS-ResourceMapping.' Both parameters 'nrofRBs' and 'startingRB' are configured as integer multiples of 4 RBs, and the reference point for parameter 'startingRB' is CRB 0 on the common resource block grid. If $$startingRB < N_{BWP}^{start},$$

the UE shall assume that the initial CRB index of the CSI-RS resource is $$N_{initialRB} = N_{BWP}^{start},$$

otherwise $N_{initial\ RB}$=startingRB. If $$nrofRBs > N_{BWP}^{size} + N_{BWP}^{start} - N_{initialRB},$$

the UE shall assume that the bandwidth of the CSI-RS resource is $$N_{CSI-RS}^{BW} = N_{BWP}^{size} + N_{BWP}^{start} - N_{initialRB},$$

otherwise $$N_{CSI-RS}^{BW} = nrofRBs.$$

In all cases, the UE shall expect that $$N_{CSI-RS}^{BW} \geq min(24, N_{BWP}^{size}).$$

Regarding Channel State Information-Interference Measurement ("CSI-IM"), the UE can be configured with one or more CSI-IM resource set configuration(s) as indicated by the higher layer parameter CSI-IM-ResourceSet. Each CSI-IM resource set consists of K≥1 CSI-IM resource(s).

The following parameters are configured via higher layer parameter CSI-IM-Resource for each CSI-IM resource configuration: A) parameter 'csi-IM-ResourceId' determines CSI-IM resource configuration identity; B) parameters 'subcarrierLocation-p0' or 'subcarrierLocation-p1' defines subcarrier occupancy of the CSI-IM resource within a slot for parameter 'csi-IM-ResourceElementPattern' set to 'pattern0' or 'pattern1', respectively; C) parameter 'symbol-Location-p0' or 'symbolLocation-p1' defines OFDM symbol location of the CSI-IM resource within a slot for parameter 'csi-IM-ResourceElementPattern' set to 'pattern0' or 'pattern1', respectively; D) parameter 'period-icityAndOffset' defines the CSI-IM periodicity and slot offset for periodic/semi-persistent CSI-IM; E) parameter 'freqBand' includes parameters to enable configuration of frequency-occupancy of CSI-IM.

In each of the PRBs configured by 'freqBand,' the UE shall assume the location for each CSI-IM resource according to the following conditions: if parameter 'csi-IM-ResourceElementPattern' is set to 'pattern0,' then the UE shall assume each CSI-IM resource is located in resource elements $(k_{CSI-IM}, l_{CSI-IM})$, $(k_{CSI-IM}, l_{CSI-IM}+1)$, $(k_{CSI-IM}+1, l_{CSI-IM})$, and $(k_{CSI-IM}+1, l_{CSI-IM})$; if parameter 'csi-IM-ResourceElementPattern' is set to 'pattern1,' then the UE shall assume each CSI-IM resource is located in resource elements $(k_{CSI-IM}, l_{CSI-IM})$, $(k_{CSI-IM}+1, l_{CSI-IM})$, $(k_{CSI-IM}+2, l_{CSI-IM})$, and $(k_{CSI-IM}+3, l_{CSI-IM})$. Here, $k_{CSI-IM}$ and $l_{CSI-IM}$ are the configured frequency-domain location and time-domain location, respectively, given by the higher layer parameters in the above list.

In some embodiments, the terms antenna, panel, and antenna panel are used interchangeably. An antenna panel may be a hardware that is used for transmitting and/or receiving radio signals at frequencies lower than 6 GHz, e.g., FR1, or higher than 6 GHz, e.g., Frequency Range #2 ("FR2", referring to radio frequencies from 24.25 GHz to 52.6 GHz) or millimeter wave ("mmWave"). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device (e.g., the UE 205, or another node) to amplify signals that are transmitted or received from one or multiple spatial directions.

In some embodiments, an antenna panel may or may not be virtualized as an antenna port in the specifications. An antenna panel may be connected to a baseband processing module through a radio frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices such as a central unit ("CU"), it can be used for signaling or local decision making.

In some embodiments, an antenna panel may be a physical or logical antenna array comprising a set of antenna elements or antenna ports that share a common or a significant portion of an RF chain (e.g., in-phase/quadrature ("I/Q") modulator, analog-to-digital ("A/D") converter, local oscillator, phase shift network). The antenna panel may be a logical entity with physical antennas mapped to the logical entity. The mapping of physical antennas to the logical entity may be up to implementation.

Communicating (i.e., receiving or transmitting) on at least a subset of antenna elements or antenna ports active for radiating energy (also referred to herein as active elements) of an antenna panel requires biasing or powering on of the RF chain which results in current drain or power consumption in the device (e.g., node) associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function.

Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on implementation, a "panel" can have at least one of the following functionalities as an operational role of Unit of antenna group to control its transmit ("Tx") beam independently, Unit of antenna group to control its transmission power independently, Unit of antenna group to control its transmission timing independently. The "panel" may be transparent to another node (e.g., next hop neighbor node). For certain condition(s), another node or network entity can assume the mapping between device's physical antennas to the logical entity "panel" may not be changed.

For example, the condition may include until the next update or report from device or comprise a duration of time over which the network entity (e.g., the RAN node 207) assumes there will be no change to the mapping. Device may report its capability with respect to the "panel" to the network entity. The device capability may include at least the number of "panels. In one implementation, the device may support transmission from one beam within a panel; with multiple panels, more than one beam (one beam per panel) may be used for transmission. In another implementation, more than one beam per panel may be supported/used for transmission.

In some of the embodiments described, an antenna port is defined such that the channel over which a symbol on the antenna port is conveyed can be inferred from the channel over which another symbol on the same antenna port is conveyed.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial receive ("Rx") parameters. Two antenna ports may be quasi-located with respect to a subset of the large-scale properties and different subset of large-scale properties may be indicated by a Quasi-Co-Location ("QCL") Type. The QCL Type can indicate which channel properties are the same between the two reference signals (e.g., on the two antenna ports). Thus, the reference signals can be linked to each other with respect to what the device can assume about their channel statistics or QCL properties. For example, the parameter 'qcl-Type' may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

Other values of 'qcl-Type' may be defined based on combination of one or large-scale properties.

Spatial Rx parameters may include one or more of: angle of arrival ("AoA"), Dominant AoA, average AoA, angular spread, Power Angular Spectrum ("PAS") of AoA, angle of departure ("AoD"), average AoD, PAS of AoD, transmit/receive channel correlation, transmit/receive beamforming, spatial channel correlation etc.

The QCL-TypeA, QCL-TypeB and QCL-TypeC may be applicable for all carrier frequencies, but the QCL-TypeD may be applicable only in higher carrier frequencies (e.g., mmWave, FR2 and beyond), where essentially the device may not be able to perform omnidirectional transmission, i.e., the device would need to form beams for directional transmission. A QCL-TypeD between two reference signals A and B, the reference signal A is considered to be spatially co-located with reference signal B and the device may assume that the reference signals A and B can be received with the same spatial filter (e.g., with the same Rx beamforming weights).

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity (CDD). The procedure used to derive antenna ports from physical antennas may be specific to a device implementation and transparent to other devices.

In some of the embodiments described, a TCI-state (Transmission Configuration Indication) associated with a target transmission can indicate parameters for configuring a quasi-collocation relationship between the target transmission (e.g., target RS of DMRS ports of the target transmission during a transmission occasion) and a source reference signal(s) (e.g., SSB/CSI-RS/SRS) with respect to quasi co-location type parameter(s) indicated in the corresponding TCI state. The TCI describes which reference signals are used as QCL source, and what QCL properties can be derived from each reference signal. A device can receive a configuration of a plurality of transmission configuration indicator states for a serving cell for transmissions on the serving cell (e.g., between an Integrated Access and Backhaul Distributed Unit ("IAB-DU") of a parent Integrated Access and Backhaul node ("IAB node"—, e.g., a type of a 5G relay station) and an Integrated Access and Backhaul Mobile Termination ("IAB-MT") of a child JAB node). In some of the embodiments described, a TCI state comprises at least one source RS to provide a reference (device assumption) for determining QCL and/or spatial filter.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

Figure 9:
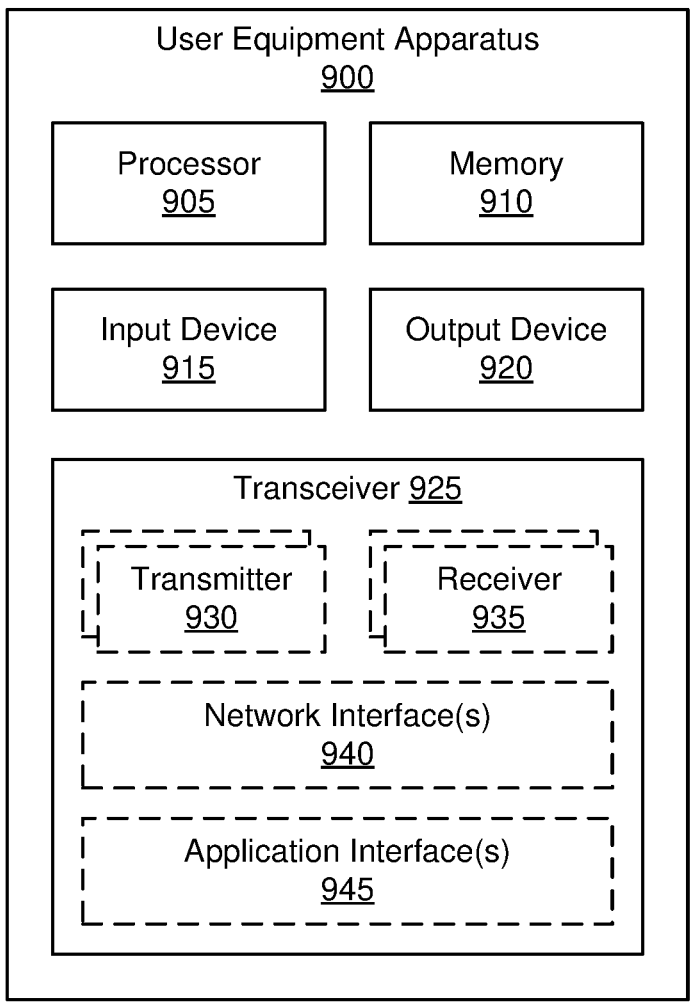
FIG. 9 is a block diagram illustrating one embodiment of a network apparatus that may be used for interference management for full-duplex operation.

FIG. 9 depicts a user equipment apparatus 900 that may be used for interference management for full-duplex operation, according to embodiments of the disclosure. In various embodiments, the user equipment apparatus 900 is used to implement one or more of the solutions described above. The user equipment apparatus 900 may be one embodiment of the remote unit 105 and/or the UE 205, as described above. Furthermore, the user equipment apparatus 900 may include a processor 905, a memory 910, an input device 915, an output device 920, and a transceiver 925.

In some embodiments, the input device 915 and the output device 920 are combined into a single device, such as a touchscreen. In certain embodiments, the user equipment apparatus 900 may not include any input device 915 and/or output device 920. In various embodiments, the user equipment apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. In some embodiments, the transceiver 925 communicates with one or more cells (or wireless coverage areas) supported by one or more base units 121. In various embodiments, the transceiver 925 is operable on unlicensed spectrum. Moreover, the transceiver 925 may include multiple UE panels supporting one or more beams. Additionally, the transceiver 925 may support at least one network interface 940 and/or application interface 945. The application interface(s) 945 may support one or more APIs. The network interface(s) 940 may support 3GPP reference points, such as Uu, N1, PC5, etc. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the processor 905 controls the user equipment apparatus 900 to implement the above described UE behaviors. In certain embodiments, the processor 905 may include an application processor (also known as "main processor") which manages application-domain and operating system ("OS") functions and a baseband processor (also known as "baseband radio processor") which manages radio functions.

In various embodiments, via the transceiver 925, the processor 905 receives a first configuration from a Radio Access Network ("RAN"), where the first configuration includes at least one of: A) an UL FD-RS configuration (where the UL FD-RS configuration indicates at least time-frequency resources, a multiplexing type, and time-domain behavior for UL FD-RS transmission and/or measurement); B) a DL FD-RS configuration (where the DL FD-RS configuration indicates at least time-frequency resources, a multiplexing type, and time-domain behavior for DL FD-RS reception and measurement); C) an indication to activate the UL FD-RS configuration and to perform corresponding transmissions and/or measurements; D) an indication to activate the DL FD-RS configuration and to perform corresponding measurements; or E) some combination thereof. The UE is not simultaneously activated with the UL FD-RS configuration and the DL FD-RS configuration. The processor that performs a first activity according to the first configuration, where the first activity is selected from: 1) transmission on received UL FD-RS resources (i.e., if scheduled); 2) measurement on received UL FD-RS resources (i.e., if indicated); 3) measurements on the received DL FD-RS resources (i.e., if indicated); or 4) some combination thereof.

In some embodiments, the UL FD-RS configuration is common to a plurality of UEs (e.g., is a common RRC configuration). In some embodiments, the DL FD-RS configuration is common to a plurality of UEs (e.g., is a common RRC configuration). In certain embodiments, the processor 905 additionally receives from the RAN (i.e., via the transceiver 925) a UE-specific QCL assumption for at least beam indication to: A) transmit an UL FD-RS; B) receive a DL FD-RS; or C) a combination thereof.

In some embodiments, the indication to activate the UL FD-RS configuration includes indication that full-duplex mode operation is enabled in the RAN. In some embodiments, the indication to activate the DL FD-RS configuration includes indication that full-duplex mode operation is enabled in the RAN. In some embodiments, the processor further measures UE-to-UE co-channel interference when FD mode is enabled at the RAN. In such embodiments, said measuring uses at least one of the UL FD-RS configuration and the DL FD-RS configuration.

In some embodiments, the processor 905 additionally receives from the RAN (i.e., via the transceiver 925) an indication from the RAN for the type of the expected measurement corresponding to a resource indicated to UE for measurement and receiving a reporting configuration from the RAN corresponding to a resource indicated for measurement. Here, the reporting configuration includes: 1) a time/frequency resource for transmission of the measurement report to the network; 2) a reporting time pattern a reporting criteria and reporting type; or 3) a combination thereof. In such embodiments, the processor additionally performs measurements according to the received first configuration from the RAN (i.e., if indicated) and transmitting a report of the performed measurements to the RAN according to the received reporting configuration (i.e., if scheduled).

In certain embodiments, the DL FD-RS is a ZP RS. In such embodiments, the UE is configured to perform interference measurements and to perform corresponding reporting to the RAN. In certain embodiments, the UE is configured with RRC common configuration that is additionally indicated to other UEs with same reporting quantity to be reported corresponding the measurements on DL FD-RS.

In some embodiments, the processor 905 additionally receives from the RAN (i.e., via the transceiver 925) a beam configuration to perform adjustments to a Rx beam at the UE for a resource indicated for FD-RS measurements (e.g., to tune the Rx filter to suppress UL-DL co channel interference during the UL FD RS measurements).

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to interference management for full-duplex operation. For example, the memory 910 may store various parameters, panel/beam configurations, resource assignments, policies, and the like as described above. In certain embodiments, the memory 910 also stores program code and related data, such as an operating system or other controller algorithms operating on the apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 920 may include a wearable display separate from, but communicatively coupled to, the rest of the user equipment apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 communicates with one or more network functions of a mobile communication network via one or more access networks. The transceiver 925 operates under the control of the processor 905 to transmit messages, data, and other signals and also to receive messages, data, and other signals. For example, the processor 905 may selectively activate the transceiver 925 (or portions thereof) at particular times in order to send and receive messages.

The transceiver 925 includes at least transmitter 930 and at least one receiver 935. One or more transmitters 930 may be used to provide UL communication signals to a base unit 121, such as the UL transmissions described herein. Similarly, one or more receivers 935 may be used to receive DL communication signals from the base unit 121, as described herein. Although only one transmitter 930 and one receiver 935 are illustrated, the user equipment apparatus 900 may have any suitable number of transmitters 930 and receivers 935. Further, the transmitter(s) 930 and the receiver(s) 935 may be any suitable type of transmitters and receivers. In one embodiment, the transceiver 925 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 925, transmitters 930, and receivers 935 may be implemented as physically separate components that access a shared hardware resource and/or software resource, such as for example, the network interface 940.

In various embodiments, one or more transmitters 930 and/or one or more receivers 935 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 930 and/or one or more receivers 935 may be implemented and/or integrated into a multi-chip module. In some embodiments, other components such as the network interface 940 or other hardware components/circuits may be integrated with any number of transmitters 930 and/or receivers 935 into a single chip. In such embodiment, the transmitters 930 and receivers 935 may be logically configured as a transceiver 925 that uses one more common control signals or as modular transmitters 930 and receivers 935 implemented in the same hardware chip or in a multi-chip module.

Figure 10:
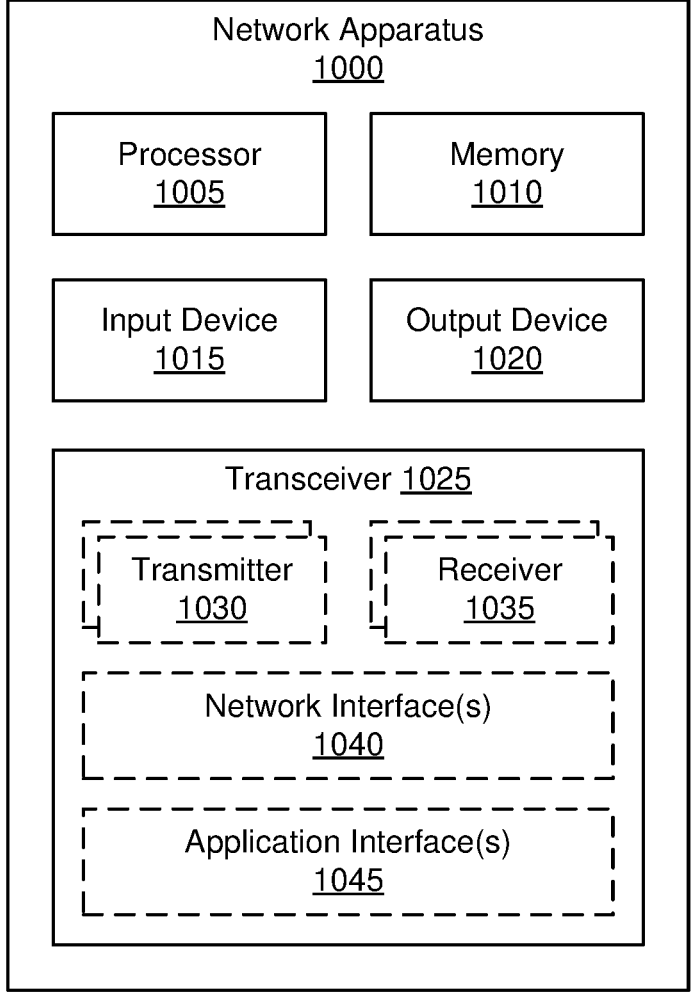
FIG. 10 is a flowchart diagram illustrating one embodiment of a first method for interference management for full-duplex operation.

FIG. 10 depicts a network apparatus 1000 that may be used for interference management for full-duplex operation, according to embodiments of the disclosure. In one embodiment, network apparatus 1000 may be one implementation of a RAN device, such as the base unit 121 and/or RAN node 207, as described above. Furthermore, the network apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the network apparatus 1000 may not include any input device 1015 and/or output device 1020. In various embodiments, the network apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. Here, the transceiver 1025 communicates with one or more remote units 105. Additionally, the transceiver 1025 may support at least one network interface 1040 and/or application interface 1045. The application interface(s) 1045 may support one or more APIs. The network interface(s) 1040 may support 3GPP reference points, such as Uu, N1, N2 and N3. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a CPU, a GPU, an auxiliary processing unit, a FPGA, or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025.

In various embodiments, the network apparatus 1000 is a RAN node (e.g., gNB) that communicates with one or more UEs, as described herein. In such embodiments, the processor 1005 controls the network apparatus 1000 to perform the above described RAN behaviors. When operating as a RAN node, the processor 1005 may include an application processor (also known as "main processor") which manages application-domain and operating system ("OS") functions and a baseband processor (also known as "baseband radio processor") which manages radio functions.

In various embodiments, via the transceiver 1025, the processor 1005 transmits a first configuration to a UE. Here, the first configuration includes at least one of: A) an UL FD-RS configuration indicating at least time-frequency resources, a multiplexing type, and time-domain behavior for UL FD-RS transmission and/or measurement); B) a DL FD-RS configuration indicating at least time-frequency resources, a multiplexing type, and time-domain behavior for DL FD-RS measurement; C) an indication to activate the UL FD-RS configuration and to perform corresponding transmissions and/or measurements; D) an indication to activate the DL FD-RS configuration and to perform corresponding measurements; or E) some combination thereof. Note that the UE is not simultaneously activated with the UL FD-RS configuration and the DL FD-RS configuration. Via the transceiver 1025, the processor 1005 receives a first communication from the UE, i.e., an UL FD-RS transmitted on UL FD-RS resources according to the first configuration and/or a report of measurements performed according to the first configuration.

In some embodiments, the processor 1005 measures self-interference at the apparatus 1000 when FD mode is enabled. In such embodiments, said measuring uses at least one of the UL FD-RS configuration and the DL FD-RS configuration. In some embodiments, the processor 1005 measures inter-gNB interference when FD mode is enabled. In such embodiments, said measuring uses at least one of the UL FD-RS configuration and the DL FD-RS configuration.

In some embodiments, the indication to activate the UL FD-RS configuration includes indication that full-duplex mode operation is enabled in the RAN. In some embodiments, the indication to activate the DL FD-RS configuration includes indication that full-duplex mode operation is enabled in the RAN. In certain embodiments, the processor 1005 further transmits to the UE (i.e., via the transceiver 1025) a UE-specific QCL assumption for at least beam indication to: A) transmit an UL FD-RS; B) receive a DL FD-RS; or C) a combination thereof.

In some embodiments, the indication to activate the UL FD-RS configuration comprises indication that full-duplex mode operation is enabled in the RAN. In some embodiments, the indication to activate the DL FD-RS configuration comprises indication that full-duplex mode operation is enabled in the RAN.

In some embodiments, via the transceiver 1025, the processor 1005 further transmits to the UE: A) an indication for the type of the expected measurement corresponding to a resource indicated to UE for measurement and B) a reporting configuration to the UE corresponding to a resource indicated for measurement. Here, the reporting configuration includes: 1) a time/frequency resource for transmission of the measurement report to the network; 2) a reporting time pattern a reporting criteria and reporting type; or 3) a combination thereof. In such embodiments, the processor 1005 additionally receives from the UE (i.e., via the transceiver 1025) a report of the performed measurements from the UE according to the reporting configuration (i.e., if scheduled).

In certain embodiments, the DL FD-RS is a ZP RS. In such embodiments, the UE is configured to perform interference measurements and to perform corresponding reporting to the RAN. In certain embodiments, the UE is configured with RRC common configuration that is additionally indicated to other UEs with same reporting quantity to be reported corresponding the measurements on DL FD-RS.

In some embodiments, the processor 1005 further transmits to the UE (i.e., via the transceiver 1025) a beam configuration to perform adjustments to a Rx beam at the UE for a resource indicated for FD-RS measurements (e.g., to tune the Rx filter to suppress UL-DL co channel interference during the UL FD RS measurements).

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data related to interference management for full-duplex operation. For example, the memory 1010 may store parameters, configurations, resource assignments, policies, and the like, as described above. In certain embodiments, the memory 1010 also stores program code and related data, such as an operating system or other controller algorithms operating on the apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, an LCD display, an LED display, an OLED display, a projector, or similar display device capable of outputting images, text, or the like to a user. As another, non-limiting, example, the output device 1020 may include a wearable display separate from, but communicatively coupled to, the rest of the network apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 includes at least transmitter 1030 and at least one receiver 1035. One or more transmitters 1030 may be used to communicate with the UE, as described herein. Similarly, one or more receivers 1035 may be used to communicate with network functions in the Public Land Mobile Network ("PLMN") and/or RAN, as described herein. Although only one transmitter 1030 and one receiver 1035 are illustrated, the network apparatus 1000 may have any suitable number of transmitters 1030 and receivers 1035. Further, the transmitter(s) 1030 and the receiver(s) 1035 may be any suitable type of transmitters and receivers.

Figure 11:
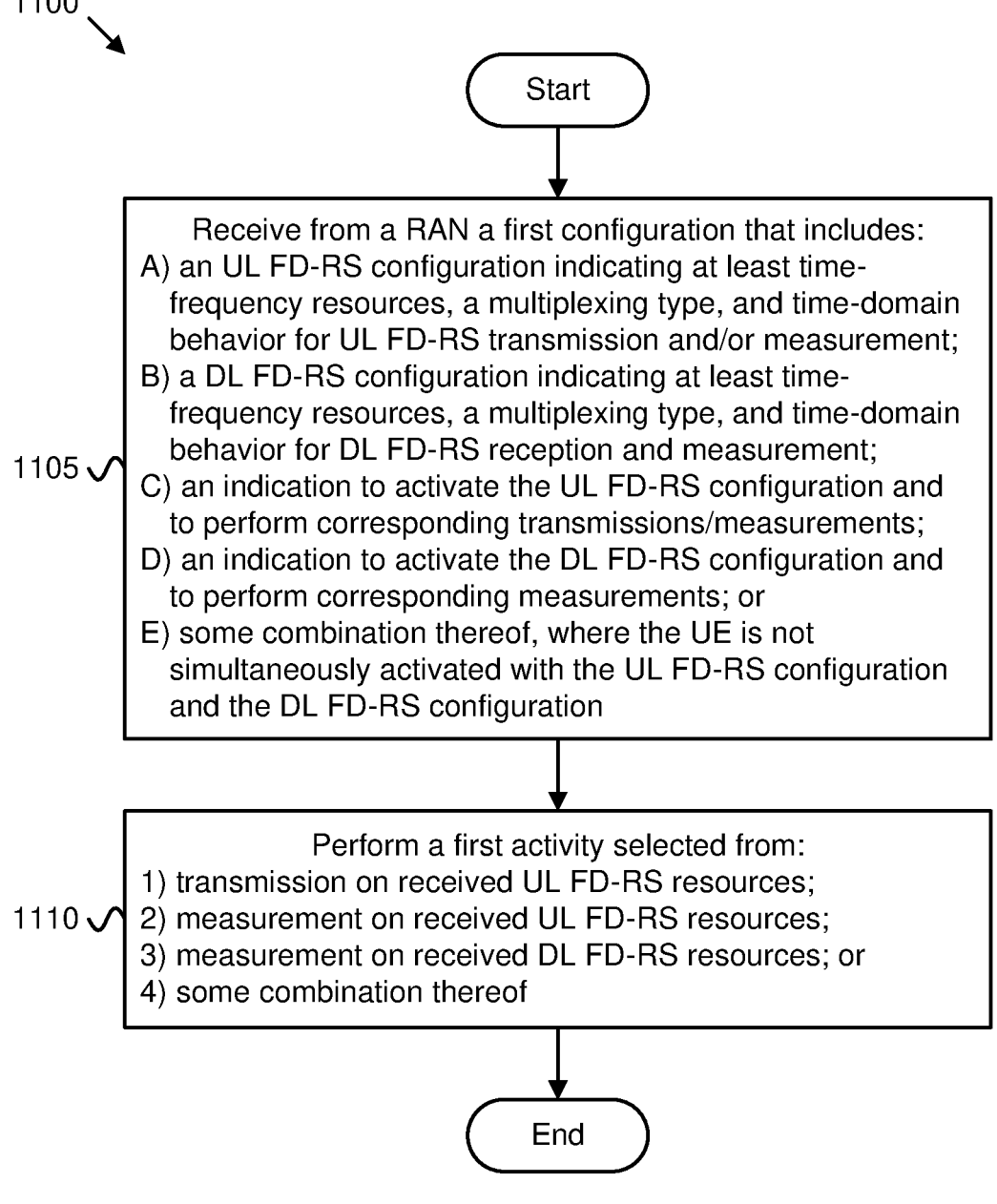
FIG. 11 is a flowchart diagram illustrating one embodiment of a second method for interference management for full-duplex operation.

FIG. 11 depicts one embodiment of a method 1100 for interference management for full-duplex operation, according to embodiments of the disclosure. In various embodiments, the method 1100 is performed by a UE device, such as the remote unit 105, the UE 205, and/or the user equipment apparatus 900, described above as described above. In some embodiments, the method 1100 is performed by a processor, such as a microcontroller, a microprocessor, a CPU, a GPU, an auxiliary processing unit, a FPGA, or the like.

The method 1100 begins and receives 1105 a first configuration from a RAN (i.e., a gNB), where the first configuration includes: A) an UL FD-RS configuration indicating at least time-frequency resources, a multiplexing type, and time-domain behavior for UL FD-RS transmission and/or measurement; B) a DL FD-RS configuration indicating at least time-frequency resources, a multiplexing type, and time-domain behavior for DL FD-RS reception and measurement; C) an indication to activate the UL FD-RS configuration and to perform corresponding transmissions and/or measurements; D) an indication to activate the DL FD-RS configuration and to perform corresponding measurements; or E) some combination thereof, where the UE is not simultaneously activated with the UL FD-RS configuration and the DL FD-RS configuration. The method 1100 includes performing 1110 a first activity according to the first configuration, where the first activity is selected from: 1) transmission on received UL FD-RS resources; 2) measurement on received UL FD-RS resources (e.g., UE-to-UE CCI interference measurement); 3) measurement on received DL FD-RS resources; or 4) some combination thereof. The method 1100 ends.

FIG. 12 depicts one embodiment of a method 1200 for interference management for full-duplex operation, according to embodiments of the disclosure. In various embodiments, the method 1200 is performed by a network entity, such as the base unit 121, the RAN node 207, and/or the network apparatus 1000, described above as described above. In some embodiments, the method 1200 is performed by a processor, such as a microcontroller, a microprocessor, a CPU, a GPU, an auxiliary processing unit, a FPGA, or the like.

The method 1200 begins and transmits 1205 a first configuration to a UE, where the first configuration includes at least one of: A) an UL FD-RS configuration indicating at least time-frequency resources, a multiplexing type, and time-domain behavior for UL FD-RS transmission and/or measurement); B) a DL FD-RS configuration (where the DL FD-RS configuration indicates at least time-frequency resources, a multiplexing type, and time-domain behavior for DL FD-RS measurement); C) an indication to activate the UL FD-RS configuration and to perform corresponding transmissions and/or measurements; D) an indication to activate the DL FD-RS configuration and to perform corresponding measurements; or E) some combination thereof. The UE is not simultaneously activated with the UL FD-RS configuration and the DL FD-RS configuration. The method 1200 includes receiving 1210 a first communication from the UE, where the first communication comprises at least one of: 1) an UL FD-RS transmitted on UL FD-RS resources according to the first configuration; 2) a report of measurements performed according to the first configuration; or 3) a combination thereof. The method 1200 ends.

Disclosed herein is a first apparatus for interference management for full-duplex operation, according to embodiments of the disclosure. The first apparatus may be implemented by a UE device, such as the remote unit 105, the UE 205, and/or the user equipment apparatus 900, described above. The first apparatus includes a processor and a transceiver that receives a first configuration from a Radio Access Network ("RAN"), where the first configuration includes at least one of: A) an UL FD-RS configuration (where the UL FD-RS configuration indicates at least time-frequency resources, a multiplexing type, and time-domain behavior for UL FD-RS transmission and/or measurement); B) a DL FD-RS configuration (where the DL FD-RS configuration indicates at least time-frequency resources, a multiplexing type, and time-domain behavior for DL FD-RS reception and measurement); C) an indication to activate the UL FD-RS configuration and to perform corresponding transmissions and/or measurements; D) an indication to activate the DL FD-RS configuration and to perform corresponding measurements; or E) some combination thereof. The UE is not simultaneously activated with the UL FD-RS configuration and the DL FD-RS configuration. The processor that performs a first activity according to the first configuration, where the first activity is selected from: 1) transmission on received UL FD-RS resources (i.e., if scheduled); 2) measurement on received UL FD-RS resources (i.e., if indicated); 3) measurements on the received DL FD-RS resources (i.e., if indicated); or 4) some combination thereof.

In some embodiments, the UL FD-RS configuration is common to a plurality of UEs (e.g., is a common RRC configuration). In some embodiments, the DL FD-RS configuration is common to a plurality of UEs (e.g., is a common RRC configuration). In certain embodiments, the transceiver further receives, from the RAN, a UE-specific QCL assumption for at least beam indication to: A) transmit an UL FD-RS; B) receive a DL FD-RS; or C) a combination thereof.

In some embodiments, the indication to activate the UL FD-RS configuration includes indication that full-duplex mode operation is enabled in the RAN. In some embodiments, the indication to activate the DL FD-RS configuration includes indication that full-duplex mode operation is enabled in the RAN. In some embodiments, the processor further measures UE-to-UE co-channel interference when FD mode is enabled at the RAN. In such embodiments, said measuring uses at least one of the UL FD-RS configuration and the DL FD-RS configuration.

In some embodiments, the transceiver further receives an indication from the RAN for the type of the expected measurement corresponding to a resource indicated to UE for measurement and receiving a reporting configuration from the RAN corresponding to a resource indicated for measurement. Here, the reporting configuration includes: 1) a time/frequency resource for transmission of the measurement report to the network; 2) a reporting time pattern a reporting criteria and reporting type; or 3) a combination thereof. In such embodiments, the processor additionally performs measurements according to the received first configuration from the RAN (i.e., if indicated) and transmitting a report of the performed measurements to the RAN according to the received reporting configuration (i.e., if scheduled).

In certain embodiments, the DL FD-RS is a ZP RS. In such embodiments, the UE is configured to perform interference measurements and to perform corresponding reporting to the RAN. In certain embodiments, the UE is configured with RRC common configuration that is additionally indicated to other UEs with same reporting quantity to be reported corresponding the measurements on DL FD-RS.

In some embodiments, the transceiver further receives a beam configuration from the RAN to perform adjustments to a Rx beam at the UE for a resource indicated for FD-RS measurements (e.g., to tune the Rx filter to suppress UL-DL co channel interference during the UL FD RS measurements).

Disclosed herein is a first method for interference management for full-duplex operation, according to embodiments of the disclosure. The first method may be performed by a UE device, such as the remote unit 105, the UE 205, and/or the user equipment apparatus 900, described above. The first method includes receiving a first configuration from a RAN (i.e., a gNB), where the first configuration includes at least one of: A) an UL FD-RS configuration (where the UL FD-RS configuration indicates at least time-frequency resources, a multiplexing type, and time-domain behavior for UL FD-RS transmission and/or measurement, e.g., UE-to-UE CCI interference measurement); B) a DL FD-RS configuration (where the DL FD-RS configuration indicates at least time-frequency resources, a multiplexing type, and time-domain behavior for DL FD-RS reception and measurement); C) an indication to activate the UL FD-RS configuration and to perform corresponding transmissions and/or measurements; D) an indication to activate the DL FD-RS configuration and to perform corresponding measurements; or E) some combination thereof. The UE is not simultaneously activated with the UL FD-RS configuration and the DL FD-RS configuration. The first method includes performing a first activity according to the first configuration, where the first activity is selected from: 1) transmission on received UL FD-RS resources (i.e., if scheduled); 2) measurement on received UL FD-RS resources (i.e., if indicated); 3) measurement on received DL FD-RS resources (i.e., if indicated); or 4) some combination thereof.

In some embodiments, the UL FD-RS configuration is common to a plurality of UEs (e.g., is a common RRC configuration). In some embodiments, the DL FD-RS configuration is common to a plurality of UEs (e.g., is a common RRC configuration). In certain embodiments, the first method further includes receiving, from the RAN, a UE-specific QCL assumption for at least beam indication to: A) transmit an UL FD-RS; B) receive a DL FD-RS; or C) a combination thereof.

In some embodiments, the indication to activate the UL FD-RS configuration includes indication that full-duplex mode operation is enabled in the RAN. In some embodiments, the indication to activate the DL FD-RS configuration includes indication that full-duplex mode operation is enabled in the RAN. In some embodiments, the first method further includes measuring UE-to-UE co-channel interference when FD mode is enabled at the RAN. In such embodiments, said measuring uses at least one of the UL FD-RS configuration and the DL FD-RS configuration.

In some embodiments, the first method further includes receiving an indication from the RAN for the type of the expected measurement corresponding to a resource indicated to UE for measurement and receiving a reporting configuration from the RAN corresponding to a resource indicated for measurement. Here, the reporting configuration includes: 1) a time/frequency resource for transmission of the measurement report to the network; 2) a reporting time pattern a reporting criteria and reporting type; or 3) a combination thereof. In such embodiments, the first method additionally includes performing measurements according to the received first configuration from the RAN (i.e., if indicated) and transmitting a report of the performed measurements to the RAN according to the received reporting configuration (i.e., if scheduled).

In certain embodiments, the DL FD-RS is a ZP RS. In such embodiments, the UE is configured to perform interference measurements and to perform corresponding reporting to the RAN. In certain embodiments, the UE is configured with RRC common configuration that is additionally indicated to other UEs with same reporting quantity to be reported corresponding the measurements on DL FD-RS.

In some embodiments, the first method further includes receiving a beam configuration from the RAN to perform adjustments to a Rx beam at the UE for a resource indicated for FD-RS measurements (e.g., to tune the Rx filter to suppress UL-DL co channel interference during the UL FD RS measurements).

Disclosed herein is a second apparatus for interference management for full-duplex operation, according to embodiments of the disclosure. The second apparatus may be implemented by a RAN node, such as the base unit 121, the RAN node 207, and/or the network apparatus 1000, described above. The second apparatus includes a processor and a transmitter that transmits a first configuration to a UE, where the first configuration includes at least one of: A) an UL FD-RS configuration (where the UL FD-RS configuration indicates at least time-frequency resources, a multiplexing type, and time-domain behavior for UL FD-RS transmission and/or measurement); B) a DL FD-RS configuration (where the DL FD-RS configuration indicates at least time-frequency resources, a multiplexing type, and time-domain behavior for DL FD-RS measurement); C) an indication to activate the UL FD-RS configuration and to perform corresponding transmissions and/or measurements; D) an indication to activate the DL FD-RS configuration and to perform corresponding measurements; or E) some combination thereof. The UE is not simultaneously activated with the UL FD-RS configuration and the DL FD-RS configuration. The second apparatus includes a receiver that receives a first communication from the UE, wherein the first communication comprises at least one of: 1) an UL FD-RS transmitted on UL FD-RS resources according to the first configuration; 2) a report of measurements performed according to the first configuration; or 3) a combination thereof.

In some embodiments, the processor further measures self-interference at the RAN node when FD mode is enabled. In such embodiments, said measuring uses at least one of the UL FD-RS configuration and the DL FD-RS configuration. In some embodiments, the processor further measures inter-gNB interference when FD mode is enabled. In such embodiments, said measuring uses at least one of the UL FD-RS configuration and the DL FD-RS configuration.

In some embodiments, the indication to activate the UL FD-RS configuration includes indication that full-duplex mode operation is enabled in the RAN. In some embodiments, the indication to activate the DL FD-RS configuration includes indication that full-duplex mode operation is enabled in the RAN. In certain embodiments, the transmitter further includes transmits, to the UE, a UE-specific QCL assumption for at least beam indication to: A) transmit an UL FD-RS; B) receive a DL FD-RS; or C) a combination thereof.

In some embodiments, the indication to activate the UL FD-RS configuration comprises indication that full-duplex mode operation is enabled in the RAN. In some embodiments, the indication to activate the DL FD-RS configuration comprises indication that full-duplex mode operation is enabled in the RAN.

In some embodiments, the transmitter further transmits an indication to the UE for the type of the expected measurement corresponding to a resource indicated to UE for measurement and transmitting a reporting configuration to the UE corresponding to a resource indicated for measurement. Here, the reporting configuration includes: 1) a time/frequency resource for transmission of the measurement report to the network; 2) a reporting time pattern a reporting criteria and reporting type; or 3) a combination thereof. In such embodiments, the receiver additionally receives a report of the performed measurements from the UE according to the reporting configuration (i.e., if scheduled).

In certain embodiments, the DL FD-RS is a ZP RS. In such embodiments, the UE is configured to perform interference measurements and to perform corresponding reporting to the RAN. In certain embodiments, the UE is configured with RRC common configuration that is additionally indicated to other UEs with same reporting quantity to be reported corresponding the measurements on DL FD-RS.

In some embodiments, the transmitter further transmits a beam configuration to the UE to perform adjustments to a Rx beam at the UE for a resource indicated for FD-RS measurements (e.g., to tune the Rx filter to suppress UL-DL co channel interference during the UL FD RS measurements).

Disclosed herein is a second method for interference management for full-duplex operation, according to embodiments of the disclosure. The second method may be performed by a RAN node, such as the base unit 121, the RAN node 207, and/or the network apparatus 1000, described above. The second method includes transmitting a first configuration to a UE, where the first configuration includes at least one of: A) an UL FD-RS configuration (where the UL FD-RS configuration indicates at least time-frequency resources, a multiplexing type, and time-domain behavior for UL FD-RS transmission and/or measurement); B) a DL FD-RS configuration (where the DL FD-RS configuration indicates at least time-frequency resources, a multiplexing type, and time-domain behavior for DL FD-RS measurement); C) an indication to activate the UL FD-RS configuration and to perform corresponding transmissions and/or measurements; D) an indication to activate the DL FD-RS configuration and to perform corresponding measurements; or E) some combination thereof. The UE is not simultaneously activated with the UL FD-RS configuration and the DL FD-RS configuration. The second method includes receiving a first communication from the UE, where the first communication comprises at least one of: 1) an UL FD-RS transmitted on UL FD-RS resources according to the first configuration (if scheduled); 2) a report of measurements performed according to the first configuration (if scheduled); or 3) a combination thereof.

In some embodiments, the second method further includes measuring self-interference at the RAN node when FD mode is enabled. In such embodiments, said measuring uses at least one of the UL FD-RS configuration and the DL FD-RS configuration. In some embodiments, the second method further includes measuring inter-gNB interference when FD mode is enabled. In such embodiments, said measuring uses at least one of the UL FD-RS configuration and the DL FD-RS configuration.

In some embodiments, the indication to activate the UL FD-RS configuration includes indication that full-duplex mode operation is enabled in the RAN. In some embodiments, the indication to activate the DL FD-RS configuration includes indication that full-duplex mode operation is enabled in the RAN. In certain embodiments, the second method further includes transmitting, to the UE, a UE-specific QCL assumption for at least beam indication to: A) transmit an UL FD-RS; B) receive a DL FD-RS; or C) a combination thereof.

In some embodiments, the indication to activate the UL FD-RS configuration comprises indication that full-duplex mode operation is enabled in the RAN. In some embodiments, the indication to activate the DL FD-RS configuration comprises indication that full-duplex mode operation is enabled in the RAN.

In some embodiments, the second method further includes transmitting an indication to the UE for the type of the expected measurement corresponding to a resource indicated to UE for measurement and transmitting a reporting configuration to the UE corresponding to a resource indicated for measurement. Here, the reporting configuration includes: 1) a time/frequency resource for transmission of the measurement report to the network; 2) a reporting time pattern a reporting criteria and reporting type; or 3) a combination thereof. In such embodiments, the second method additionally includes receiving a report of the performed measurements from the UE according to the reporting configuration (i.e., if scheduled).

In certain embodiments, the DL FD-RS is a ZP RS. In such embodiments, the UE is configured to perform interference measurements and to perform corresponding reporting to the RAN. In certain embodiments, the UE is configured with RRC common configuration that is additionally indicated to other UEs with same reporting quantity to be reported corresponding the measurements on DL FD-RS.

In some embodiments, the second method further includes transmitting a beam configuration to the UE to perform adjustments to a Rx beam at the UE for a resource indicated for FD-RS measurements (e.g., to tune the Rx filter to suppress UL-DL co channel interference during the UL FD RS measurements).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:

at least one memory; and at least one processor coupled with the at least one memory and configured to cause the UE to:

receive a first configuration from a radio access network ("RAN"), wherein the first configuration comprises at least one of:

an uplink ("UL") full-duplex reference signal ("FD-RS") configuration, wherein the UL FD-RS configuration indicates at least time-frequency resources, a multiplexing type, and time-domain behavior for UL FD-RS transmission or measurement;

a downlink ("DL") FD-RS configuration, wherein the DL FD-RS configuration indicates at least time-frequency resources, a multiplexing type, and time-domain behavior for DL FD-RS reception and measurement;

a first indication to activate the UL FD-RS configuration and to perform one or more corresponding transmissions or first measurements;

a second indication to activate the DL FD-RS configuration received with the first configuration and to perform one or more corresponding second measurements;

or some combination thereof, wherein the first configuration does not include both the first indication and the second indication, and the UE is not simultaneously activated with the UL FD-RS configuration and the DL FD-RS configuration; and perform a first activity according to the first configuration, wherein the first activity is selected from:

performing a transmission on received UL FD-RS resources when the first configuration comprises the UL FD-RS configuration;

performing a first measurement on received UL FD-RS resources when the first configuration comprises the UL FD-RS configuration; and performing a second measurement on received DL FD-RS resources when the first configuration comprises the DL FD-RS configuration;

or some combination thereof.

2. The UE of claim 1, wherein the UL FD-RS configuration or the DL FD-RS configuration, or both, are common to a plurality of UEs.

3. The UE of claim 1, wherein the at least one processor is configured to cause the UE to receive, from the RAN, a UE-specific quasi-co-location ("QCL") assumption for at least beam indication to:

transmit an UL FD-RS;

receive a DL FD-RS;

or a combination thereof.

4. The UE of claim 1, wherein the first indication to activate the UL FD-RS configuration comprises an indication that full-duplex mode operation is enabled in the RAN.

5. The UE of claim 1, wherein the second indication to activate the DL FD-RS configuration comprises an indication that full-duplex mode operation is enabled in the RAN.

6. The UE of claim 1, wherein further comprising measuring UE to UE co-channel interference-when full-duplex mode operation is enabled at the RAN, the at least one processor is configured to cause the UE to measure a UE-to-UE co-channel interference using at least one of the UL FD-RS configuration and the DL FD-RS configuration.

7. The UE of claim 1, wherein the at least one processor is configured to cause the UE to:

receive an indication from the RAN for a type of expected measurement corresponding to a resource indicated to UE for measurement;

receive a reporting configuration from the RAN corresponding to a resource indicated for measurement, the reporting configuration comprising:

a time/frequency resource for transmission of a measurement report to the network, a reporting time pattern a reporting criteria and reporting type, or some combination thereof;

perform measurements according to the first configuration; and transmit a report of the performed measurements to the RAN according to the reporting configuration.

8. The UE of claim 7, wherein the DL FD-RS is a zero-power ("ZP") reference signal ("RS"), wherein the at least one processor is configured to cause the UE to perform interference measurements and to perform corresponding reporting to the RAN.

9. The UE of claim 1, wherein the at least one processor is configured to cause the UE to receive, from the RAN, a beam configuration from the RAN to perform adjustments to a receive ("Rx") beam at the UE for a resource indicated for FD-RS measurements.

10. A method performed by a user equipment ("UE"), the method comprising:

receiving a first configuration from a radio access network ("RAN"), wherein the first configuration comprises at least one of:

an uplink ("UL") full-duplex reference signal ("FD-RS") configuration, wherein the UL FD-RS configuration indicates at least time-frequency resources, a multiplexing type, and time-domain behavior for UL FD-RS transmission or measurement;

a downlink ("DL") FD-RS configuration, wherein the DL FD-RS configuration indicates at least time-frequency resources, a multiplexing type, and time-domain behavior for DL FD-RS reception and measurement;

a first indication to activate the UL FD-RS configuration received with the first configuration and to perform one or more corresponding transmissions or first measurements;

a second indication to activate the DL FD-RS configuration received with the first configuration and to perform one or more corresponding second measurements;

or some combination thereof, wherein the first configuration does not include both the first indication and the second indication, and the UE is not simultaneously activated with the UL FD-RS configuration and the DL FD-RS configuration; and performing a first activity according to the first configuration, wherein the first activity is selected from:

transmission on received UL FD-RS resources when the first configuration comprises the UL FD-RS configuration;

measurement on received UL FD-RS resources when the first configuration comprises the UL FD-RS configuration; and measurements on received DL FD-RS resources when the first configuration comprises the DL FD-RS configuration;

or some combination thereof.

11. A base station for wireless communication, comprising:

at least one memory; and at least one processor coupled with the at least one memory and configured to cause the base station to:

transmit a first configuration to a user equipment ("UE"), wherein the first configuration comprises at least one of:

an uplink ("UL") full-duplex reference signal ("FD-RS") configuration, wherein the UL FD-RS configuration indicates at least time-frequency resources, a multiplexing type, and time-domain behavior for UL FD-RS transmission or measurement;

a downlink ("DL") FD-RS configuration, wherein the DL FD-RS configuration indicates at least time-frequency resources, a multiplexing type, and time-domain behavior for DL FD-RS measurement;

a first indication to activate the UL FD-RS configuration transmitted with the first configuration and to perform corresponding transmissions or measurements;

a second indication to activate the DL FD-RS configuration transmitted with the first configuration and to perform corresponding measurements;

or some combination thereof, wherein the first configuration does not include both the first indication and the second indication, and the UE is not simultaneously activated with the UL FD-RS configuration and the DL FD-RS configuration; and receive a first communication from the UE, wherein the first communication comprises at least one of:

receiving an UL FD-RS transmitted on UL FD-RS resources according to the UL FD-RS configuration when the first configuration comprises the UL FD-RS configuration; or receiving a measurement report comprising first measurements performed according to the UL FD-RS configuration when the first configuration comprises the UL FD-RS configuration or second measurements performed according to the DL FD-RS configuration when the first configuration comprises the DL FD-RS configuration.

12. The base station of claim 11, wherein the DL FD-RS configuration indicates a zero-power ("ZP") reference signal ("RS"), wherein the at least one processor is configured to cause the base station to transmit, to the UE, a configuration for performing interference measurements and to performing corresponding reporting to the base station.

13. The base station of claim 12, wherein the at least one processor is configured to cause the base station to transmit, to the UE, a radio resource control ("RRC") common configuration that is additionally indicated to one or more other UEs with a same reporting quantity to be reported for measurements of the ZP RS.

14. The base station of claim 11, wherein when full-duplex mode operation is enabled, the at least one processor is configured to cause the base station to measure self-interference at the base station using the UL FD-RS configuration or the DL FD-RS configuration.

15. The base station of claim 11, wherein when full-duplex mode operation is enabled, the at least one processor is configured to cause the base station to measure inter-gNB interference using the UL FD-RS configuration or the DL FD-RS configuration.

16. The base station of claim 11, wherein the at least one processor is configured to cause the base station to transmit, to the UE, a UE-specific Quasi-Co-Location ("QCL") assumption for at least beam indication to:

transmit an UL FD-RS;

receive a DL FD-RS;

or a combination thereof.

17. The base station of claim 11, wherein the first indication to activate the UL FD-RS configuration comprises an indication that full-duplex mode operation is enabled in a radio access network ("RAN") corresponding to the base station.

18. The base station of claim 11, wherein the second indication to activate the DL FD-RS configuration comprises an indication that full-duplex mode operation is enabled in a radio access network ("RAN") corresponding to the base station.

19. The base station of claim 11, wherein the at least one processor is configured to cause the base station to:

transmit, to the UE, an indication for a type of expected measurement corresponding to a resource indicated for measurement;

transmit, to the UE, a reporting configuration corresponding to the resource indicated for measurement, the reporting configuration comprising:

a time/frequency resource for transmission of the measurement report, a reporting time pattern a reporting criteria and reporting type, or some combination thereof; and receive the measurement report in accordance with the reporting configuration.

20. A method performed by a base station, the method comprising:

transmitting a first configuration to a user equipment ("UE"), wherein the first configuration comprises at least one of:

an uplink ("UL") full-duplex reference signal ("FD-RS") configuration, wherein the UL FD-RS configuration indicates at least time-frequency resources, a multiplexing type, and time-domain behavior for UL FD-RS transmission or measurement;

a downlink ("DL") FD-RS configuration, wherein the DL FD-RS configuration indicates at least time-frequency resources, a multiplexing type, and time-domain behavior for DL FD-RS measurement;

a first indication to activate the UL FD-RS configuration transmitted with the first configuration and to perform one or more corresponding transmissions or first measurements;

a second indication to activate the DL FD-RS configuration transmitted with the first configuration and to perform one or more corresponding second measurements;

or some combination thereof, wherein the first configuration does not include both the first indication and the second indication, and a UE is not simultaneously activated with the UL FD-RS configuration and the DL FD-RS configuration; and receiving a first communication from the UE, wherein the first communication comprises at least one of:

an UL FD-RS transmitted on UL FD-RS resources according to the UL FD-RS configuration when the first configuration comprises the UL FD-RS configuration; or a measurement report comprising first measurements performed according to the UL FD-RS configuration when the first configuration comprises the UL FD-RS configuration or second measurements performed according to the DL FD-RS configuration when the first configuration comprises the DL FD-RS configuration.

* * * * *